United States Patent
Ozawa et al.

(10) Patent No.: US 12,159,657 B2
(45) Date of Patent: Dec. 3, 2024

(54) MAGNETIC RECORDING MEDIUM HAVING CHARACTERIZED MAGNETIC LAYER, MAGNETIC TAPE CARTRIDGE, AND MAGNETIC RECORDING AND REPRODUCING DEVICE

(71) Applicant: FUJIFILM Corporation, Tokyo (JP)

(72) Inventors: Eiki Ozawa, Minamiashigara (JP); Takashi Fujimoto, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/455,273

(22) Filed: Aug. 24, 2023

(65) Prior Publication Data

US 2023/0402060 A1  Dec. 14, 2023

Related U.S. Application Data

(63) Continuation of application No. PCT/JP2022/007650, filed on Feb. 24, 2022.

(30) Foreign Application Priority Data

Feb. 26, 2021  (JP) .................. 2021-030919

(51) Int. Cl.
| | |
|---|---|
| *G11B 5/706* | (2006.01) |
| *G11B 5/714* | (2006.01) |
| *G11B 5/73* | (2006.01) |
| *G11B 5/735* | (2006.01) |
| *G11B 5/84* | (2006.01) |

(52) U.S. Cl.
CPC .............. *G11B 5/706* (2013.01); *G11B 5/714* (2013.01); *G11B 5/73* (2013.01); *G11B 5/735* (2013.01); *G11B 5/7356* (2019.05); *G11B 5/84* (2013.01)

(58) Field of Classification Search
None
See application file for complete search history.

(56) References Cited

U.S. PATENT DOCUMENTS

| | | |
|---|---|---|
| 2018/0005737 A1 | 1/2018 | Sakane et al. |
| 2018/0366151 A1 | 12/2018 | Ohkoshi et al. |
| 2020/0251141 A1 | 8/2020 | Ozawa et al. |
| 2020/0279582 A1 | 9/2020 | Fujimoto |
| 2022/0036919 A1* | 2/2022 | Ichise .................... H01F 1/344 |

FOREIGN PATENT DOCUMENTS

| | | |
|---|---|---|
| JP | 2016-130208 A | 7/2016 |
| JP | 2018-110168 A | 7/2018 |
| JP | 2020-123419 A | 8/2020 |
| JP | 2020-140748 A | 9/2020 |
| WO | 2017094752 A1 | 6/2017 |

OTHER PUBLICATIONS

International Search Report dated May 17, 2022 in Application No. PCT/JP2022/007650.
Written Opinion of the International Searching Authority dated May 17, 2022 in Application No. PCT/JP2022/007650.
International Preliminary Report on Patentability (With Translation of Written Opinion) dated Aug. 29, 2023 in Application No. PCT/JP2022/007650.

* cited by examiner

*Primary Examiner* — Kevin M Bernatz
(74) *Attorney, Agent, or Firm* — Sughrue Mion, PLLC

(57) ABSTRACT

Provided are a magnetic recording medium including a non-magnetic support, and a magnetic layer including a ferromagnetic powder. The ferromagnetic powder is an ε-iron oxide powder, and an intensity ratio (Int1/Int2) of diffraction intensities obtained by an X-ray diffraction analysis of the magnetic layer using an In-Plane method after the magnetic layer is pressed at a pressure of 70 atm is 1.0 or more and 6.5 or less, a magnetic tape cartridge and a magnetic recording and reproducing device each including the magnetic recording medium.

18 Claims, No Drawings

MAGNETIC RECORDING MEDIUM HAVING CHARACTERIZED MAGNETIC LAYER, MAGNETIC TAPE CARTRIDGE, AND MAGNETIC RECORDING AND REPRODUCING DEVICE

CROSS-REFERENCE TO RELATED APPLICATIONS

This application is a Continuation of PCT International Application No. PCT/JP2022/007650 filed on Feb. 24, 2022, which claims priority under 35 U.S.C. § 119(a) to Japanese Patent Application No. 2021-030919 filed on Feb. 26, 2021. Each of the above applications is hereby expressly incorporated by reference, in its entirety, into the present application.

BACKGROUND OF THE INVENTION

1. Field of the Invention

The present invention relates to a magnetic recording medium, a magnetic tape cartridge, and a magnetic recording and reproducing device.

2. Description of the Related Art

A magnetic recording medium has been widely used as a data storage recording medium for recording and storing various pieces of data (see, for example, JP2016-130208A).

SUMMARY OF THE INVENTION

In a magnetic recording medium, a magnetic layer containing a ferromagnetic powder is usually provided on a non-magnetic support. Regarding the ferromagnetic powder, for example, as disclosed in JP2016-130208A, an ε-iron oxide powder has attracted attention in recent years.

It is desired that the magnetic recording medium has excellent running stability. This is because in a case where the magnetic recording medium is inferior in running stability, a decrease in reproducing output or the like occurs due to off-track.

Data recorded on various recording media such as a magnetic recording medium is called hot data, warm data, or cold data depending on an access frequency (reproduction frequency). The access frequency decreases in the order of hot data, warm data, and cold data, and recording and long-term storage of data with a low access frequency (for example, cold data) is called archiving (archive). With dramatic increase in the amount of information and digitization of various kinds of information in recent years, the amount of data recorded and stored in the recording medium for archiving increases, and therefore, attention is paid to a recording and reproducing system suitable for archiving.

A magnetic recording medium capable of exhibiting excellent running stability in a case of reproducing data after long-term storage as described above is suitable as a recording medium for archiving. However, according to studies of the present inventor, there was tendency that, in the magnetic recording medium containing an ε-iron oxide powder as the ferromagnetic powder in the magnetic layer, running stability is likely to deteriorate after the long-term storage described above, although the reason is not clear.

In view of the above, an aspect of the present invention is to provide a magnetic recording medium that includes a magnetic layer containing an ε-iron oxide powder as a ferromagnetic powder and in which a deterioration in running stability after long-term storage can be suppressed.

An aspect of the present invention relates to a magnetic recording medium comprising: a non-magnetic support; and a magnetic layer containing a ferromagnetic powder, in which the ferromagnetic powder is an ε-iron oxide powder, and an intensity ratio (Int1/Int2) (hereinafter, also referred to as "intensity ratio after pressing (Int1/Int2)") of diffraction intensities obtained by an X-ray diffraction analysis of the magnetic layer using an In-Plane method after the magnetic layer is pressed at a pressure of 70 atm is 1.0 or more and 6.5 or less. Regarding the unit, 1 atm=101325 Pa (Pascal) =101325 N (Newton)/m².

The Int1 is a maximum value of a diffraction intensity in a range in which a diffraction angle $2\theta\chi$ is 29.0° or more and 31.0° or less, and the Int2 is a maximum value of a diffraction intensity in a range in which the diffraction angle $2\theta\chi$ is 36.3° or more and 37.5° or less. The term "Int" is used as abbreviation for intensity.

In one embodiment, the intensity ratio (Int1/Int2) may be 1.5 or more and 6.0 or less.

In one embodiment, the intensity ratio (Int1/Int2) may be 3.0 or more and 5.5 or less.

In one embodiment, the ε-iron oxide powder may contain a cobalt element.

In one embodiment, the ε-iron oxide powder may further contain an element selected from the group consisting of a gallium element and an aluminum element.

In one embodiment, the ε-iron oxide powder may further contain a titanium element.

In one embodiment, the magnetic recording medium may further comprise a non-magnetic layer containing a non-magnetic powder between the non-magnetic support and the magnetic layer.

In one embodiment, the magnetic recording medium may further comprise a back coating layer containing a non-magnetic powder on a surface side of the non-magnetic support opposite to a surface side on which the magnetic layer is provided.

In one embodiment, the magnetic recording medium may be a magnetic tape.

Another aspect of the present invention relates to a magnetic tape cartridge comprising the magnetic tape described above.

Still another aspect of the present invention relates to a magnetic recording and reproducing device comprising the magnetic recording medium.

According to an aspect of the present invention, it is possible to provide a magnetic recording medium that includes a magnetic layer containing an ε-iron oxide powder as a ferromagnetic powder and in which a deterioration in running stability after long-term storage can be suppressed. In addition, according to an aspect of the present invention, it is possible to provide a magnetic tape cartridge and a magnetic recording and reproducing device including the magnetic recording medium.

DESCRIPTION OF THE PREFERRED EMBODIMENTS

[Magnetic Recording Medium]

An aspect of the present invention relates to a magnetic recording medium including a non-magnetic support, and a magnetic layer containing a ferromagnetic powder. The ferromagnetic powder is an ε-iron oxide powder, and an intensity ratio (Int1/Int2) of diffraction intensities obtained by an X-ray diffraction analysis of the magnetic layer using an In-Plane method after the magnetic layer is pressed at a pressure of 70 atm is 1.0 or more and 6.5 or less. The Int1 is a maximum value of a diffraction intensity in a range in which a diffraction angle $2\theta\chi$ is 29.0° or more and 31.0° or less, and the Int2 is a maximum value of a diffraction intensity in a range in which the diffraction angle $2\theta\chi$ is 36.3° or more and 37.5° or less.

The present inventor has conducted intensive studies regarding the magnetic recording medium including the magnetic layer containing an ε-iron oxide powder to suppress a deterioration in running stability after long-term storage, and found that it is suitable to press the magnetic layer at a pressure of 70 atm in an acceleration test corresponding to an example of archiving. Details are as follows.

For example, the magnetic tape is usually accommodated in a magnetic tape cartridge in a state of being wound around a reel. Therefore, the long-term storage of the magnetic tape after data with a low access frequency is recorded is also performed in a state where the magnetic tape is accommodated in the magnetic tape cartridge. In the magnetic tape wound around the reel, a magnetic layer surface is in contact with a back coating layer (in a case where it has a back coating layer) or a surface of the non-magnetic support opposite to the magnetic layer side (in a case where it does not have a back coating layer). Therefore, the magnetic layer is in a pressed state in the magnetic tape cartridge. As a result of various simulations performed by the present inventor, it is determined that it is suitable to press the magnetic layer at a pressure of 70 atm in the acceleration test corresponding to long-term storage (example of archiving) for about 10 years in a room temperature environment of a relative humidity of 40% to 60%. In the present invention and the present specification, a room temperature means a temperature in a range of 20° C. to 25° C. Therefore, the present inventor has evaluated the running stability after pressing the magnetic layer at 70 atm, and as a result of intensive studies based on the results of this evaluation, the present inventor has found that the magnetic recording medium with the intensity ratio after pressing (Int1/Int2) in the range described above has little deterioration in running stability after pressing the magnetic layer at 70 atm, that is, after placing the magnetic layer in a state corresponding to a state after the long-term storage, while the magnetic layer contains the ε-iron oxide powder. The fact that the intensity ratio after pressing (Int1/Int2) has to be controlled in this manner is a new finding that has not been known in the related art and is not disclosed in JP2016-130208A described above.
<Intensity Ratio after Pressing (Int1/Int2)>

In the present invention and the present specification, the intensity ratio after pressing (Int1/Int2) is a value obtained by the following method.
(Pressing of Magnetic Layer)

The pressure of 70 atm for pressing the magnetic layer is a surface pressure applied to a surface of the magnetic layer by pressing. In the present invention and the present specification, the "magnetic layer surface (surface of the magnetic layer)" has the same meaning as a surface of the magnetic recording medium on a magnetic layer side. By causing the magnetic recording medium to pass between two rolls while causing the magnetic recording medium to run at a speed of 20 m/min, the surface pressure of 70 atm is applied to the surface of the magnetic layer. A tension of 0.5 N/m is applied to the running magnetic recording medium in a running direction. For example, for a tape-shaped magnetic recording medium (that is, a magnetic tape), a tension of 0.5 N/m is applied in a longitudinal direction of the running magnetic tape. The pressing is performed by causing the magnetic recording medium to pass between two rolls six times in total and applying the surface pressure of 70 atm at each time in a case of passing each roll. A metal roll is used as the roll, and the roll is not heated. An environment for performing the pressing is an environment in which an atmosphere temperature is 20° C. to 25° C. and a relative humidity is 40% to 60%. The magnetic recording medium in which the pressing is performed is a magnetic recording medium which has not been subjected to the long-term storage for 10 years or longer in a room temperature environment of a relative humidity of 40% to 60%, and the storage corresponding to such long-term storage or an acceleration test corresponding to such long-term storage. The same applies to various physical properties relating to the magnetic recording medium described in the present invention and the present specification, unless otherwise noted.

The pressing described above can be performed by, for example, using a calendering treatment device used for manufacturing a magnetic recording medium. For example, a magnetic tape accommodated in a magnetic tape cartridge is taken out and caused to pass through calendar rolls in the calendering treatment device, and accordingly, the magnetic tape can be pressed at a pressure of 70 atm.
(X-Ray Diffraction Analysis)

The intensity ratio after pressing (Int1/Int2) is obtained by an X-ray diffraction analysis of a magnetic layer containing an ε-iron oxide powder using the In-Plane method after the pressing. Hereinafter, the X-ray diffraction analysis performed using the In-Plane method is also referred to as "In-Plane XRD". The term "XRD" is an abbreviation for X-ray diffraction. The In-Plane XRD is performed by irradiating a magnetic layer surface with X-rays under the following conditions using a thin-film X-ray diffractometer after the pressing. A measurement direction is a direction orthogonal to a longitudinal direction for a magnetic tape, and is a direction orthogonal to a radial direction for a magnetic disk.

Use of Cu ray source (output of 45 kV, 200 mA)
Scan condition: scanning a range of 20° to 40° (degrees) at 0.05°/step and 0.1°/min
Optical system used: parallel optical system
Measurement method: $2\theta\chi$ scan (X-ray incidence angle of 0.25°)

The above-described conditions are set values in the thin-film X-ray diffractometer. A well-known device can be used as the thin-film X-ray diffractometer. As the thin-film X-ray diffractometer, SmartLab manufactured by Rigaku Corporation can be exemplified. A sample to be subjected to the In-Plane XRD analysis is a medium sample cut out from the magnetic recording medium which is a measurement target after the pressing, and the size and the shape thereof are not limited, as long as an X-ray diffraction spectrum, which will be described below, can be confirmed.

As a method of the X-ray diffraction analysis, thin-film X-ray diffraction and powder X-ray diffraction are used. In the powder X-ray diffraction, X-ray diffraction of a powder sample is measured, whereas, according to the thin-film X-ray diffraction, X-ray diffraction of a layer or the like formed on a substrate can be measured. The thin-film X-ray diffraction is classified into the In-Plane method and an Out-Of-Plane method. The X-ray incidence angle during the measurement is usually in a range of 5.00° to 90.00° in the Out-Of-Plane method, whereas the X-ray incidence angle is usually in a range of 0.20° to 0.50° in the In-Plane method. In the In-Plane XRD of the present invention and the present specification, the X-ray incidence angle is 0.25° as described above. In the In-Plane method, the X-ray incidence angle is smaller than that in the Out-Of-Plane method, and thus, a depth of penetration of the X-ray is shallow. Therefore, according to the X-ray diffraction analysis by using the In-Plane method (In-Plane XRD), it is possible to perform the X-ray diffraction analysis of a surface layer portion of a measurement target sample. According to the In-Plane XRD, it is possible to perform the X-ray diffraction analysis of the magnetic layer on a sample cut out from the magnetic recording medium. In the X-ray diffraction spectrum (vertical axis: diffraction intensity, horizontal axis: diffraction angle $2\theta\chi$ (°)) obtained by the In-Plane XRD, the maximum value of the diffraction intensity in a range of $29.0°\leq 2\theta\chi\leq 31.0°$ is "Int1", and the maximum value of the diffraction intensity in a range of $36.3°\leq 2\theta\chi\leq 37.5°$ is "Int2". The intensity ratio (Int1/Int2) is calculated as a ratio of Int1 and Int2 thus obtained.

The present inventor considers that the above-mentioned intensity ratio after pressing (Int1/Int2) obtained for a magnetic layer containing an ε-iron oxide powder is a value that can be an index of a presence state of the ε-iron oxide powder in the magnetic layer after the pressing. More specifically, the present inventor supposes this point as follows.

In general, recording of data on a magnetic recording medium and reproducing of recorded data are performed by running the magnetic recording medium in a magnetic recording and reproducing device (generally referred to as a "drive") and causing a magnetic layer surface and a magnetic head to come into contact with each other to be slid on each other. The presence of a foreign matter between the magnetic layer surface and the magnetic head during such running causes a deterioration in running stability. Examples of the foreign matter include scraps (generally referred to as "debris") generated by scraping the magnetic recording medium due to sliding on the magnetic head. Therefore, it is desirable that the occurrence of debris can be suppressed in order to improve the running stability of the magnetic recording medium. As a component that can contribute to suppressing the occurrence of debris, a lubricant described below can be exemplified. It is considered that the lubricant contributes to stabilizing a sliding state between the magnetic layer surface and the magnetic head, and it is supposed that the occurrence of debris can be suppressed by this. For the intensity ratio after pressing (Int1/Int2), the present inventor considers that the value of the intensity ratio after pressing (Int1/Int2) becomes larger as particles of the ε-iron oxide powder are present in a surface layer portion of the magnetic layer in a state where a specific crystal plane of the particles with a strong bonding force with the lubricant is aligned more parallel to the magnetic layer surface after the pressing. The present inventor supposes that the more such crystal plane is aligned more parallel to the magnetic layer surface, the more a functional group that can exert a lubricating function of the lubricant can be exposed to the magnetic layer surface, which enables the magnetic layer surface and the magnetic head to be slid on each other more stably after the pressing, that is, after placing the magnetic layer in a state corresponding to a state after the long-term storage, thereby suppressing the occurrence of debris. Note that the present invention is not limited to the supposition described in the present specification.

From the viewpoint of improving the running stability after the long-term storage of the magnetic recording medium including the magnetic layer containing the ε-iron oxide powder, the intensity ratio after pressing (Int1/Int2) is 1.0 or more, preferably 1.5 or more, more preferably 2.0 or more, still more preferably 2.5 or more, still more preferably 3.0 or more, and still more preferably 3.5 or more. In addition, it is supposed that, in a case where the intensity ratio after pressing (Int1/Int2) is 6.5 or less, the amount by which the functional group that can exert the lubricating function of the lubricant is exposed to the magnetic layer surface can be maintained at an appropriate amount. The present inventor considers that this also contributes to improving the running stability after the long-term storage of the magnetic recording medium including the magnetic layer containing the ε-iron oxide powder. From this viewpoint, the intensity ratio (Int1/Int2) of the magnetic recording medium is 6.5 or less, preferably 6.0 or less, and more preferably 5.5 or less. A control method of the intensity ratio after pressing (Int1/Int2) will be described below.

Hereinafter, the magnetic recording medium will be further described in detail.

<Magnetic Layer>

<<ε-Iron Oxide Powder>>

The magnetic recording medium contains an ε-iron oxide powder as a ferromagnetic powder in a magnetic layer. In the present invention and the present specification, the term "ε-iron oxide powder" refers to a ferromagnetic powder in which an ε-iron oxide crystal structure (ε phase) is detected as a main phase by X-ray diffraction analysis. For example, in a case where the highest intensity diffraction peak is attributed to an ε-iron oxide crystal structure in an X-ray diffraction spectrum obtained by X-ray diffraction analysis, it is determined that the ε-iron oxide crystal structure (ε phase) is detected as the main phase. In addition to the ε phase of the main phase, an α phase and/or a γ phase may or may not be included. An ε-iron oxide powder in the present invention and the present specification includes a so-called non-substitution type ε-iron oxide powder composed of iron and oxygen, and a so-called substitution type ε-iron oxide powder including one or more substituent elements substituting for iron.

(Method of Manufacturing ε-Iron Oxide Powder)

As a method of manufacturing an ε-iron oxide powder, a producing method from a goethite, a reverse micelle method, and the like are known. All of the manufacturing methods are well known. Regarding a method of manufacturing an ε-iron oxide powder in which a part of iron is substituted with substituent elements, a description disclosed in J. Jpn. Soc. Powder Metallurgy Vol. 61 Supplement, No. 51, pp. 5280 to 5284, J. Mater. Chem. C, 2013, 1, pp. 5200 to 5206 can be referred to, for example.

As an example, an ε-iron oxide powder contained in a magnetic layer of the magnetic recording medium can be obtained, for example, by a manufacturing method of obtaining an ε-iron oxide powder by preparing a precursor of ε-iron oxide (hereinafter, referred to as a "precursor preparation step"), subjecting the precursor to a coat-forming treatment (hereinafter, referred to as a "coat-forming step"), subjecting the precursor having undergone the coat-forming treatment to a heat treatment, thereby converting the precursor to ε-iron oxide (hereinafter, referred to as a "heat treatment step"), and subjecting the ε-iron oxide to a coat-removing treatment (hereinafter, referred to as a "coat-removing step"). The manufacturing method will be further described below. However, the manufacturing method described below is merely an example, and the ε-iron oxide powder is not limited to those manufactured by the manufacturing method exemplified below.

Precursor Preparation Step

A precursor of ε-iron oxide refers to a substance that includes an ε-iron oxide crystal structure as a main phase by being heated. The precursor can be, for example, a hydroxide, an oxyhydroxide (oxide hydroxide), or the like containing iron and an element capable of substituting for a part of iron in a crystal structure. The precursor preparation step can be performed by using a coprecipitation method, a reverse micelle method, or the like. A method of preparing such a precursor is well-known, and the precursor preparation step in the above-described manufacturing method can be performed by a well-known method. For example, for the method of preparing the precursor, a well-known technology such as paragraphs 0017 to 0021 of JP2008-174405A and examples thereof, paragraphs 0025 to 0046 of WO2016/047559A1 and examples thereof, paragraphs 0038 to 0040, 0042, 0044, and 0045 of WO2008/149785A1 and examples thereof can be referred to.

ε-Iron oxide, which does not include a substituent element substituting for a part of iron (Fe), can be represented by a composition formula of $Fe_2O_3$. On the other hand, ε-iron oxide in which a part of iron is substituted with, for example, one or more types of elements can be represented by a composition formula of $A^1_xA^2_yA^3_zFe_{(2-x-y-z)}O_3$. $A^1$, $A^2$, and $A^3$ each independently represent one or more types of substituent elements substituting for iron, and x, y, and z are each independently 0 or more and less than 2, where at least one is more than 0 and x+y+z is less than 2. The ε-iron oxide powder may or may not include a substituent element substituting for iron, and preferably includes a substituent element. A type of a substituent element can be one type or two or more types, and can be one type to three types, one type to four types, one type to five types, or one type to six types. Magnetic properties of an ε-iron oxide powder can be adjusted by a type and a substitution amount of a substituent element. In a case where a substituent element is contained, the substituent element may include one or more of Ga, Al, In, Rh, Mn, Co, Ni, Zn, Ti, Sn, and the like. For example, in the above composition formula, $A^1$ may be one or more selected from the group consisting of Ga, Al, In, and Rh, and $A^2$ may be one or more selected from the group consisting of Co, Mn, Ni, and Zn, and $A^3$ may be one or more selected from the group consisting of Ti and Sn. In one aspect, the ε-iron oxide powder can contain a cobalt element (Co), for example, one or more selected from the group consisting of a cobalt element, a gallium element (Ga), an aluminum element (Al), an indium element (In), and a rhodium element (Rh), and one or more selected from the group consisting of a titanium element (Ti) and a tin element (Sn). In one aspect, the ε-iron oxide powder can contain a cobalt element, a gallium element and/or an aluminum element, and a titanium element. In a case where an ε-iron oxide powder containing a substituent element substituting for iron is manufactured, a part of a compound serving as a supply source of iron in ε-iron oxide need only be substituted with a compound of the substituent element. The composition of an ε-iron oxide powder obtained can be controlled by the substitution amount of the compound. Examples of the compound serving as a supply source of iron and various substituent elements include an inorganic salt (which may be a hydrate) such as a nitrate, a sulfate, and a chloride, an organic salt (which may be a hydrate) such as a pentakis (hydrogen oxalate) salt, a hydroxide, an oxyhydroxide, and the like.

Coat-Forming Step

In a case where the precursor is heated after the coat-forming treatment, reaction can proceed by which the precursor is converted to ε-iron oxide under the coat. It is considered that the coat can play a role of preventing sintering from occurring during heating. From the viewpoint of ease of forming the coat, the coat-forming treatment is preferably performed in a solution, and more preferably performed by adding a coat-forming agent (compound for forming a coat) to a solution including the precursor. For example, in a case where the coat-forming treatment is performed in the same solution after the preparation of the precursor, by adding the coat-forming agent to the solution after the preparation of the precursor and stirring the solution, a coat can be formed on the precursor. As the coat, for example, a silicon-containing coat is preferable because the coat is easily formed on the precursor in the solution. Examples of the coat-forming agent for forming the silicon-containing coat include a silane compound such as alkoxysilane. Through hydrolysis of the silane compound, a silicon-containing coat can be formed on the precursor, preferably using a sol-gel method. Specific examples of the silane compound include tetraethoxysilane (tetraethyl orthosilicate; TEOS), tetramethoxysilane, and various silane coupling agents. For the coat-forming treatment, for example, a well-known technology such as a paragraph 0022 of JP2008-174405A and examples thereof, paragraphs 0047 to 0049 of WO2016/047559A1 and examples thereof, paragraphs 0041 and 0043 of WO2008/149785A1 and examples thereof can be referred to. For example, the coat-forming treatment can be performed by stirring a solution including a precursor and a coat-forming agent at a liquid temperature of 50° C. to 90° C. The stirring time may be, for example, 5 to 36 hours. The coat may cover the entire surface of the precursor, or a part of the surface of the precursor may not be covered with the coat.

Heat Treatment Step

By performing a heat treatment on the precursor having undergone the coat-forming treatment, the precursor can be converted to ε-iron oxide. The heat treatment can be performed on, for example, a powder (powder of the precursor having the coat) collected from the solution in which the coat-forming treatment is performed. For the heat treatment step, for example, well-known technology such as a paragraph 0023 of JP2008-174405A and examples thereof, a paragraph 0050 of WO2016/047559A1 and examples thereof, paragraphs 0041 and 0043 of WO2008/149785A1 and examples thereof can be referred to. The heat treatment step can be performed, for example, in a heat treatment furnace having an in-furnace temperature of 900° C. to 1200° C. for about 3 to 6 hours. The higher the temperature of the heat treatment step and/or the longer the heat treatment time, the larger the average particle size of the ε-iron oxide powder obtained tends to be.

Coat-Removing Step

By performing the heat treatment step, the precursor having the coat can be converted to ε-iron oxide. Since the coat remains on the ε-iron oxide thus obtained, a coat-removing treatment is preferably performed. For the coat-removing treatment, for example, well-known technology such as a paragraph 0025 of JP2008-174405A and examples thereof, a paragraph 0053 of WO2008/149785A1 and examples thereof can be referred to. The coat-removing treatment can be performed, for example, by stirring ε-iron oxide having the coat in a sodium hydroxide aqueous solution having a concentration of about 1 to 5 mol/L and a liquid temperature of about 60° C. to 90° C. for about 5 to 36 hours. Here, the ε-iron oxide powder contained in the magnetic layer of the magnetic recording medium may be manufactured without performing the coat-removing treatment, or may be such that the coat is not completely removed by the coat-removing treatment and a part of the coat remains.

Pulverization Step

One or more steps can be optionally executed before and/or after the various steps described above. Examples of such a step include various well-known steps such as classification, filtration, washing, and drying. Further, for example, a pulverization treatment can be executed on the ε-iron oxide powder obtained after drying. Performing the pulverization treatment can contribute to crushing the aggregation of the particles of the ε-iron oxide powder. From the viewpoint of improving the dispersibility of the ε-iron oxide powder, it is preferable to subject the particles of the ε-iron oxide powder to a dispersion treatment described below after crushing the aggregation of the particles of the ε-iron oxide powder. The present inventor supposes that, by increasing the dispersibility of the ε-iron oxide powder, the specific crystal plane of the particles of the ε-iron oxide powder with a strong bonding force with the lubricant can be aligned more parallel to the magnetic layer surface by an electric field application treatment described below. The pulverization treatment can be, for example, a pulverization treatment (mill pulverization) using a mill pulverizer. Treatment conditions for mill pulverization need only be set according to the mill pulverizer to be used, and are not particularly limited. As an example, a rotation speed of the mill pulverizer can be set to 1000 to 20000 rpm (revolutions per minute), a treatment time for one mill pulverization can be set to 0.5 to 10 minutes, and the number of times of executing the mill pulverization can be set to 1 to 4 times.

(Average Particle Size)

From the viewpoint of the magnetization stability, an average particle size of the ε-iron oxide powder contained in the magnetic layer of the magnetic recording medium is preferably 5.0 nm or more, more preferably 6.0 nm or more, still more preferably 7.0 nm or more, still more preferably 8.0 nm or more, and still more preferably 9.0 nm or more. In addition, from the viewpoint of realization of high-density recording, the average particle size of the ε-iron oxide powder is preferably 20.0 nm or less, more preferably 19.0 nm or less, still more preferably 18.0 nm or less, still more preferably 17.0 nm or less, still more preferably 16.0 nm or less, and still more preferably 15.0 nm or less.

In the present invention and the present specification, unless otherwise noted, an average particle size of various powders such as an ε-iron oxide powder is a value measured by the following method using a transmission electron microscope.

The powder is imaged at an imaging magnification of 100000× with a transmission electron microscope, and the image is printed on photographic printing paper or displayed on a display so that the total magnification is 500000×, to obtain an image of particles configuring the powder. A target particle is selected from the obtained image of particles, an outline of the particle is traced by a digitizer, and a size of the particle (primary particle) is measured. The primary particles are independent particles without aggregation.

The measurement described above is performed regarding 500 particles randomly extracted. An arithmetic average of the particle sizes of 500 particles thus obtained is an average particle size of the powder.

As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described below is a value measured by using a transmission electron microscope H-9000 manufactured by Hitachi, Ltd. as the transmission electron microscope, and image analysis software KS-400 manufactured by Carl Zeiss as the image analysis software.

In the present invention and the present specification, the powder means aggregation of a plurality of particles. For example, a ferromagnetic powder means aggregation of a plurality of ferromagnetic particles. Further, the aggregation of the plurality of particles not only includes an aspect in which particles constituting the aggregate directly come into contact with each other, but also includes an aspect in which a binding agent or an additive which will be described below is interposed between the particles. The term "particle" is used to describe a powder in some cases.

As a method of collecting sample powder from the magnetic recording medium in order to measure the particle size, a method disclosed in a paragraph 0015 of JP2011-048878A can be adopted, for example.

In the present invention and the present specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter refers to a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %, with respect to the total mass of the magnetic layer. A high content of the ferromagnetic powder in the magnetic layer is preferable from the viewpoint of improvement of the recording density.

<<Binding Agent>>

The magnetic recording medium can be a coating type magnetic recording medium, and can include a binding agent in the magnetic layer. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below.

For the binding agent described above, descriptions disclosed in paragraphs 0028 to 0031 of JP2010-24113A can be referred to. In addition, the binding agent may be a radiation curable resin such as an electron beam curable resin. For the radiation curable resin, descriptions disclosed in paragraphs 0044 and 0045 of JP2011-048878A can be referred to. An average molecular weight of the resin used as the binding agent can be, for example, 10,000 to 200,000 as a weight-average molecular weight. The weight-average molecular weight of the present invention and the present specification is a value obtained by performing polystyrene conversion of a value measured by gel permeation chromatography (GPC) under the following measurement conditions. The weight-average molecular weight of the binding agent shown in Examples described below is a value obtained by performing polystyrene conversion of a value measured under the following measurement conditions. The binding agent may be used in an amount of, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: Tetrahydrofuran (THF)

A curing agent can also be used together with the resin which can be used as the binding agent. As the curing agent, in one aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. At least a part of the curing agent is contained in the magnetic layer in a state of being reacted (crosslinked) with other components such as the binding agent, by proceeding of the curing reaction in the magnetic layer forming step. The same applies to the layer formed using this composition in a case where the composition used to form the other layer includes a curing agent. The preferred curing agent is a thermosetting compound, polyisocyanate is suitable. For details of the polyisocyanate, descriptions disclosed in paragraphs 0124 and 0125 of JP2011-216149A can be referred to. The curing agent can be used in a composition for forming a magnetic layer in an amount of, for example, 0 to 80.0 parts by mass, and preferably 10.0 to 80.0 parts by mass, and more preferably 50.0 to 80.0 parts by mass from the viewpoint of improving the strength of the magnetic layer, with respect to 100.0 parts by mass of the binding agent.

The above description regarding the binding agent and the curing agent can also be applied to a non-magnetic layer and/or a back coating layer. In this case, the above description regarding the content can be applied by replacing the ferromagnetic powder with non-magnetic powder.

<<Additive>>

The magnetic layer may include one or more kinds of additives, as necessary. As the additive, a commercially available product can be appropriately selected or manufactured by a well-known method according to the desired properties, and any amount thereof can be used. Examples of the additive include the curing agent described above. In addition, examples of the additive which can be included in the magnetic layer include a non-magnetic powder, a lubricant, a dispersing agent, a dispersing assistant, a fungicide, an antistatic agent, and an antioxidant. For the dispersing agent, descriptions disclosed in paragraphs 0061 and 0071 of JP2012-133837A can be referred to. The dispersing agent may be added to a composition for forming a non-magnetic layer. For the dispersing agent that can be added to the composition for forming a non-magnetic layer, a description disclosed in a paragraph 0061 of JP2012-133837A can be referred to.

Examples of the non-magnetic powder that can be contained in the magnetic layer include a non-magnetic powder that can function as an abrasive. Examples of the additive that can be used to improve the dispersibility of the abrasive in the magnetic layer containing the abrasive include a dispersing agent disclosed in paragraphs 0012 to 0022 of JP2013-131285A.

Examples of the non-magnetic powder that can be contained in the magnetic layer include a non-magnetic powder that can function as a protrusion forming agent for forming protrusions that protrude appropriately on the magnetic layer surface (hereinafter, referred to as a "protrusion forming agent"). As the protrusion forming agent, a particle of an inorganic substance can be used, a particle of an organic substance can be used, and a composite particle of an inorganic substance and an organic substance can also be used. Examples of the inorganic substance include an inorganic oxide such as metal oxide, metal carbonate, metal sulfate, metal nitride, metal carbide, and metal sulfide, and an inorganic oxide is preferable. In one aspect, the protrusion forming agent may be an inorganic oxide-based particle. Here, the term "-based" is used to mean "including". An aspect of the inorganic oxide-based particle is a particle made of an inorganic oxide. Another aspect of the inorganic oxide-based particle is a composite particle of an inorganic oxide and an organic substance, and specific examples thereof include a composite particle of an inorganic oxide and a polymer. Examples of such particle include a particle having a polymer bonded to a surface of an inorganic oxide particle.

An average particle size of the protrusion forming agent is, for example, 30 to 300 nm, and preferably 40 to 200 nm. The closer the particle shape is to a true sphere, the smaller the pushing resistance exerted in a case where a pressure is applied, so that the particle is likely to be pushed into the magnetic layer. On the other hand, in a case where the particle shape is a shape other than the true sphere, for example, a so-called deformed shape, a large pushing resistance is likely to be exerted in a case where a pressure is applied, so that the particle is difficult to be pushed into the magnetic layer. In addition, even a particle having a non-uniform surface and a low surface smoothness is likely to have a large pushing resistance in a case where a pressure is applied, so that the particle is difficult to be pushed into the magnetic layer. It is supposed that a use of a protrusion forming agent that is difficult to be pushed into the magnetic layer even in a case where a pressure is applied contributes to controlling the intensity ratio after pressing (Int1/Int2) to be in the range described above. This point will be further described below.

As means for controlling the intensity ratio after pressing (Int1/Int2) to be in the above-described range, the presence state of the ε-iron oxide powder in the magnetic layer before pressing is controlled, and then a change in the state due to the pressing is suppressed. One specific example of the means for controlling the presence state of the ε-iron oxide powder in the magnetic layer before pressing is the execution of the pulverization step described above, and further examples of the means described below are mentioned as specific examples. On the other hand, as means for suppressing a large change in the presence state of the ε-iron oxide powder in the magnetic layer due to the pressing, a protrusion forming agent that is difficult to be pushed into the magnetic layer even in a case where a pressure is applied is used as the protrusion forming agent. It is supposed that, in a case where the protrusion forming agent is difficult to be pushed into the magnetic layer even in a case where a pressure is applied, a role of decreasing the pressure applied to the particles of the ε-iron oxide powder, in a case where the magnetic layer is pressed, can be played by the protrusion forming agent, and as a result, the large change in the presence state of the ε-iron oxide powder in the magnetic layer due to the pressing can be suppressed.

From the viewpoint that the protrusion forming agent and the abrasive can exert their functions more satisfactorily, a content of the protrusion forming agent in the magnetic layer is preferably 1.0 to 4.0 parts by mass, and more preferably 1.2 to 3.5 parts by mass with respect to 100.0 parts by mass of the ferromagnetic powder. On the other hand, a content of the abrasive in the magnetic layer is preferably 1.0 to 20.0 parts by mass, more preferably 3.0 to 15.0 parts by mass, and still more preferably 4.0 to 10.0 parts by mass with respect to 100.0 parts by mass of the ferromagnetic powder.

(Lubricant)

The magnetic recording medium may include one or more kinds of lubricants in a portion on the magnetic layer side on a non-magnetic support. In the present invention and the present specification, the term "portion on the non-magnetic support on the magnetic layer side" refers to a magnetic layer in a case of a magnetic recording medium including the magnetic layer directly on the non-magnetic support, and refers to a magnetic layer and/or a non-magnetic layer in a case of a magnetic recording medium including the non-magnetic layer between the non-magnetic support and the magnetic layer, which will be described in detail below. The lubricant may include one or more kinds selected from the group consisting of a fatty acid, a fatty acid ester, and a fatty acid amide. As described above, the lubricant can contribute to improving the running stability of the magnetic recording medium including the magnetic layer containing the ε-iron oxide powder.

Examples of the fatty acid include lauric acid, myristic acid, palmitic acid, stearic acid, oleic acid, linoleic acid, linolenic acid, behenic acid, erucic acid, elaidic acid, stearic acid, myristic acid, and palmitic acid are preferable, and stearic acid is more preferable. The fatty acid may be included in the magnetic layer in a form of a salt such as a metal salt.

Examples of the fatty acid ester include esters of the above-described various fatty acids exemplified for a fatty acid. Specific examples thereof include, for example, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

Examples of the fatty acid amide include amides of the above various exemplified fatty acids, specifically, for example, lauric acid amide, myristic acid amide, palmitic acid amide, stearic acid amide, and the like.

For the fatty acid and a derivative of the fatty acid (such as amide and ester), a fatty acid-derived moiety of the fatty acid derivative preferably has a structure which is the same as or similar to that of the fatty acid used in combination. For example, in a case where stearic acid is used as the fatty acid, it is preferable to use stearic acid amide and/or stearic acid ester in combination.

A content of a fatty acid in the composition for forming a magnetic layer is, for example, 0.1 to 10.0 parts by mass, and preferably 1.0 to 7.0 parts by mass per 100.0 parts by mass of the ferromagnetic powder. In a case where two or more different fatty acids are added to the composition for forming a magnetic layer, the content thereof means the total content of two or more different fatty acids. The same applies to other components. In addition, in the present invention and the present specification, unless otherwise noted, a certain component may be used alone or in combination of two or more.

A content of a fatty acid ester in the composition for forming a magnetic layer is, for example, 0 to 10.0 parts by mass, and preferably 1.0 to 7.0 parts by mass per 100.0 parts by mass of the ferromagnetic powder.

A content of a fatty acid amide in the composition for forming a magnetic layer is, for example, 0.1 to 3.0 parts by mass, and preferably 0.1 to 1.0 part by mass per 100.0 parts by mass of the ferromagnetic powder.

On the other hand, the content of the fatty acid in the composition for forming a non-magnetic layer is, for example, 1.0 to 10.0 parts by mass, and preferably 1.0 to 7.0 parts by mass per 100.0 parts by mass of the non-magnetic powder. In addition, the content of the fatty acid ester in the composition for forming a non-magnetic layer is, for example, 0 to 10.0 parts by mass, and preferably 1.0 to 7.0 parts by mass per 100.0 parts by mass of the non-magnetic powder. The content of the fatty acid amide in the composition for forming a non-magnetic layer is, for example, 0.1 to 3.0 parts by mass, and preferably 0.1 to 1.0 part by mass per 100.0 parts by mass of the non-magnetic powder. The non-magnetic layer can play a role of holding a lubricant and supplying the lubricant to the magnetic layer. The lubricant included in the non-magnetic layer may be transferred to the magnetic layer and remain in the magnetic layer.

The magnetic layer described above can be provided on a surface of the non-magnetic support directly or indirectly through the non-magnetic layer.

<Non-Magnetic Layer>

The non-magnetic powder used for the non-magnetic layer may be an inorganic substance powder or an organic substance powder. In addition, carbon black and the like can be used. Examples of the inorganic substance include metal, metal oxide, metal carbonate, metal sulfate, metal nitride, metal carbide, and metal sulfide. These non-magnetic powders can be available as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50 to 90 mass % and more preferably in a range of 60 to 90 mass %, with respect to the total mass of the non-magnetic layer.

The non-magnetic layer can include a binding agent, and can also include an additive. For other details of the binding agent or the additive of the non-magnetic layer, a well-known technology regarding the non-magnetic layer can be applied. In addition, in regards to the type and the content of the binding agent, and the type and the content of the additive, for example, a well-known technology regarding the magnetic layer can be applied.

The non-magnetic layer of the present invention and the present specification also includes a substantially non-magnetic layer containing a small amount of ferromagnetic powder as impurities or intentionally, together with the non-magnetic powder. Here, the substantially non-magnetic layer is a layer having a residual magnetic flux density equal to or smaller than 10 mT, a layer having a coercivity equal to or smaller than 7.96 kA/m (100 Oe), or a layer having a residual magnetic flux density equal to or smaller than 10 mT and a coercivity equal to or smaller than 7.96 kA/m (100 Oe). It is preferable that the non-magnetic layer does not have a residual magnetic flux density and a coercivity.

<Non-Magnetic Support>

Next, the non-magnetic support will be described. Examples of the non-magnetic support (hereinafter, simply referred to as a "support") include well-known components such as polyethylene terephthalate, polyethylene naphthalate, polyamide such as aromatic polyamide, and polyamideimide subjected to biaxial stretching. Among these, polyethylene terephthalate, polyethylene naphthalate, and polyamide are preferable. A corona discharge, a plasma treatment, an easy-bonding treatment, or a heat treatment may be performed on these supports in advance.

<Back Coating Layer>

In one aspect, the magnetic recording medium may further include a back coating layer containing a non-magnetic powder on a surface side of the non-magnetic support opposite to a surface side on which the magnetic layer is provided, and in another aspect, the magnetic recording medium may not include a back coating layer. The back coating layer preferably contains any one or both of carbon black and an inorganic powder. The back coating layer can include a binding agent and can also include additives. In regards to the binding agent and the additive of the back coating layer, a well-known technology regarding the back coating layer can be applied, and a well-known technology regarding the formulation of components of the magnetic layer and/or the non-magnetic layer can be applied. For example, for the back coating layer, descriptions disclosed in paragraphs 0018 to 0020 of JP2006-331625A and column 4, line 65 to column 5, line 38 of U.S. Pat. No. 7,029,774B can be referred to.

<Various Thicknesses>

A thickness of the non-magnetic support is preferably 3.0 to 6.0 μm.

From the viewpoint of the high-density recording, which has been required in recent years, a thickness of the magnetic layer is preferably 200 nm or less, more preferably in a range of 8 to 200 nm, and still more preferably in a range of 10 to 200 nm. The magnetic layer need only be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 1.5 μm, and preferably 0.1 to 1.0 μm.

A thickness of the back coating layer is preferably 0.9 μm or less and more preferably in a range of 0.1 to 0.7 μm.

Thicknesses of each layer and the non-magnetic support of the magnetic recording medium can be obtained by a well-known film thickness measurement method. As an example, a cross section of the magnetic recording medium in a thickness direction is exposed by a well-known method of ion beams or microtome, and the exposed cross section is observed with a transmission electron microscope or a scanning electron microscope. In the cross section observation, various thicknesses can be obtained as a thickness obtained at one portion of the cross section, or an arithmetic average of thicknesses obtained at a plurality of portions of two or more portions which are randomly extracted. Alternatively, the thickness of each layer may be obtained as a designed thickness calculated under the manufacturing conditions.

<Manufacturing Step>

A step of preparing a composition for forming the magnetic layer, the non-magnetic layer, or the back coating layer can usually include at least a kneading step, a dispersing step, and, as necessary, a mixing step provided before and after these steps. Each step may be divided into two or more stages. Components used for the preparation of a composition for forming each layer may be added at an initial stage or in a middle stage of each step. As a solvent, one or more kinds of various solvents usually used for manufacturing a coating type magnetic recording medium can be used. For the solvent, for example, a description disclosed in a paragraph 0153 of JP2011-216149A can be referred to. In addition, each component can be separately added in two or more steps. In order to manufacture the above magnetic recording medium, a well-known manufacturing technology in the related art can be used in various steps. In the kneading step, an open kneader, a continuous kneader, a pressure kneader, or a kneader having a strong kneading force such as an extruder is preferably used. For details of these kneading processes, JP1989-106338A (JP-H01-106338A) and JP1989-79274A (JP-H01-79274A) can be referred to. As a disperser, a well-known disperser can be used. As a dispersion medium, one or more kinds of dispersion beads selected from the group consisting of various dispersion beads can be used. As such dispersion beads, zirconia beads, titania beads, and steel beads which are dispersion beads having high specific gravity are suitable. The present inventor supposes that increasing the dispersibility of the ε-iron oxide powder by enhancing a dispersion treatment in the preparation of the composition for forming a magnetic layer can contribute to the fact that the specific crystal plane of the particles of the ε-iron oxide powder with a strong bonding force with the lubricant can be aligned more parallel to the magnetic layer surface by an electric field application treatment described below. Specific examples of enhancing the dispersion treatment include, for example, prolonging of a dispersion treatment time, reduction of diameter of the dispersion beads used for dispersion, increasing the number of times of the dispersion treatment, and the like. Various dispersion conditions can be set according to a disperser used. As an example, a bead diameter of the dispersion beads can be set to 0.1 to 1.0 mm, the treatment time for one dispersion treatment can be set to 0.5 to 10 hours, and the number of times of the dispersion treatment can be set to 2 times or more. The composition for forming each layer may be filtered by a well-known method before performing the coating step. The filtering can be performed by using a filter, for example. As the filter used in the filtering, a filter having a pore diameter of 0.01 to 3 μm (for example, filter made of glass fiber or filter made of polypropylene) can be used, for example.

In one aspect, in a step of preparing the composition for forming a magnetic layer, after a dispersion liquid including a protrusion forming agent (hereinafter, referred to as a "protrusion forming agent liquid") is prepared, the protrusion forming agent liquid can be mixed with one or more other components of the composition for forming a magnetic layer. For example, the composition for forming a magnetic layer can be prepared by separately preparing a protrusion forming agent liquid, a dispersion liquid including an abrasive (hereinafter, referred to as an "abrasive solution"), and a dispersion liquid including ferromagnetic powder (hereinafter, referred to as a "magnetic liquid") and then mixing and dispersing them. It is preferable to prepare various dispersion liquids separately in this way in order to improve dispersibility of the ferromagnetic powder, the protrusion forming agent, and the abrasive in the composition for forming a magnetic layer. For example, the protrusion forming agent liquid can be prepared by a well-known dispersion treatment such as an ultrasonic treatment. The ultrasonic treatment can be performed for about 1 to 300 minutes at an ultrasonic output of about 10 to 2000 watts per 200 cc (1 cc=1 cm$^3$), for example. In addition, the filtering may be performed after the dispersion treatment. For the filter used for the filtering, the above description can be referred to.

The magnetic layer can be formed by directly applying the composition for forming a magnetic layer onto the non-magnetic support or performing multilayer coating of the composition for forming a magnetic layer with the composition for forming a non-magnetic layer in order or at the same time. For details of the coating for forming each layer, a description disclosed in a paragraph 0066 of JP2010-231843A can be referred to.

After the coating step, various treatments such as a drying treatment, an alignment treatment of the magnetic layer, and a surface smoothing treatment (calendering treatment) can be performed. For various treatments, for example, a well-known technology disclosed in paragraphs 0052 to 0057 of JP2010-24113A can be referred to. For example, the coating layer of the composition for forming a magnetic layer can be subjected to an alignment treatment, while the coating layer is wet. For the alignment treatment, various well-known technologies including a description disclosed in a paragraph 0067 of JP2010-231843A can be used. For example, a vertical alignment treatment can be performed by a well-known method such as a method using a polar opposing magnet. In an alignment zone, a drying speed of the coating layer can be controlled depending on a temperature, an air volume of drying air and/or a transportation speed of the non-magnetic support on which the coating layer is formed in the alignment zone. In addition, the coating layer may be preliminarily dried before the transportation to the alignment zone.

Preferably, an electric field application treatment can be performed, while the coating layer of the composition for forming a magnetic layer is wet. The electric field application treatment can be executed, for example, after the alignment treatment. An electric field can be applied perpendicularly to the surface of the coating layer by transporting the non-magnetic support on which the coating layer of the composition for forming a magnetic layer is formed between a pair of facing electrodes. Regarding the arrangement of the electrodes, for example, a positive electrode can be arranged on the magnetic layer side and a negative electrode can be arranged on the other side (for example, the back coating layer side). The applied electric field strength can be, for example, 0.2 to 2.5 kV/mm, and the value of the intensity ratio after pressing (Int1/Int2) tends to increase as the value of the applied electric field strength increases. The present inventor supposes that the functional group of the lubricant bonded to the specific crystal plane of the particles of the ε-iron oxide powder can be aligned by the electric field by performing the electric field application treatment. The present inventor considers that this can contribute to aligning the specific crystal plane of the particles of the ε-iron oxide powder bonded to the lubricant more parallel to the magnetic layer surface.

The magnetic recording medium according to one aspect of the present invention may be a tape-shaped magnetic recording medium (magnetic tape) or a disk-shaped magnetic recording medium (magnetic disk). For example, the magnetic tape is usually accommodated in a magnetic tape cartridge and the magnetic tape cartridge is mounted on a magnetic recording and reproducing device. A servo pattern can also be formed on the magnetic recording medium by a well-known method in order to enable head tracking in the magnetic recording and reproducing device. The term "formation of servo pattern" can also be referred to as "recording of servo signal". Hereinafter, the formation of the servo patterns will be described using a magnetic tape as an example.

The servo pattern is usually formed along the longitudinal direction of the magnetic tape. Examples of control (servo control) systems using a servo signal include a timing-based servo (TBS), an amplitude servo, and a frequency servo.

As shown in European Computer Manufacturers Association (ECMA)-319 (June 2001), a timing-based servo system is adopted in a magnetic tape based on a linear tape-open (LTO) standard (generally referred to as an "LTO tape"). In this timing-based servo system, the servo pattern is formed by continuously disposing a plurality of pairs of non-parallel magnetic stripes (also referred to as "servo stripes") in the longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed such that an interval thereof continuously changes along a width direction of the magnetic tape, and the servo signal reading element reads the interval to thereby sense a relative position between the servo pattern and the servo signal reading element. Information on this relative position enables tracking on a data track. Accordingly, a plurality of servo tracks are usually set on the servo pattern along the width direction of the magnetic tape.

A servo band is formed of a servo signal continuous in the longitudinal direction of the magnetic tape. A plurality of the servo bands are usually provided on the magnetic tape. For example, in an LTO tape, the number of the servo bands is five. A region interposed between two adjacent servo bands is referred to as a data band. The data band is formed of a plurality of data tracks and each data track corresponds to each servo track.

Further, in one aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

As a method for uniquely specifying the servo band, there is a method using a staggered method as shown in ECMA-319 (June 2001). In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Note that, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding the information in the servo band, a method other than the method described above can be adopted. For example, a predetermined code may be recorded by thinning out a predetermined pair from the group of pairs of servo stripes.

A head for forming a servo pattern is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. The AC erasing is performed by gradually decreasing an intensity of the magnetic field while reversing a direction of the magnetic field applied to the magnetic tape. Meanwhile, the DC erasing is performed by applying a unidirectional magnetic field to the magnetic tape. The DC erasing further includes two methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-53940A, in a case where the magnetic pattern is transferred to, using the gap, a magnetic tape that has been subjected to the vertical DC erasing, a servo signal obtained by reading the formed servo pattern has a monopolar pulse shape. Meanwhile, in a case where a magnetic pattern is transferred to, using the gap, a magnetic tape that has been subjected to horizontal DC erasing, a servo signal obtained by reading the formed servo pattern has a bipolar pulse shape.

The magnetic tape is usually accommodated in a magnetic tape cartridge and the magnetic tape cartridge is mounted in the magnetic recording and reproducing device.

[Magnetic Tape Cartridge]

Another aspect of the present invention relates to a magnetic tape cartridge including the tape-shaped magnetic recording medium (that is, the magnetic tape).

Details of the magnetic tape included in the magnetic tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing device for recording and/or reproducing data on the magnetic tape, the magnetic tape is pulled out of the magnetic tape cartridge to be wound around the reel on the magnetic recording and reproducing device side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing device side. During this time, data is recorded and/or reproduced as the magnetic head and the surface of the magnetic tape on the magnetic layer side come into contact with each other to be slid on each other. With respect to this, in the dual reel type magnetic tape cartridge, both reels of the supply reel and the winding reel are provided in the magnetic tape cartridge. The magnetic tape cartridge may be any of single reel type magnetic tape cartridge and dual reel type magnetic tape cartridge. The above magnetic tape cartridge need only include the magnetic tape according to one aspect of the present invention, and a well-known technology can be applied to the others. The total length of the magnetic tape accommodated in the magnetic tape cartridge may be, for example, 800 m or more, and may be in a range of about 800 m to 2000 m. It is preferable that the total length of the tape accommodated in the magnetic tape cartridge is long from a viewpoint of increasing the capacity of the magnetic tape cartridge.

[Magnetic Recording and Reproducing Device]

Still another aspect of the present invention relates to a magnetic recording and reproducing device comprising the magnetic recording medium.

In the present invention and the present specification, the term "magnetic recording and reproducing device" means a device capable of performing at least one of the recording of data on the magnetic recording medium or the reproducing of data recorded on the magnetic recording medium. Such a device is generally called a drive.

In the above-described magnetic recording and reproducing device, in one aspect, the magnetic recording medium is treated as a removable medium (so-called replaceable medium). In such an aspect, for example, the magnetic tape cartridge accommodating the magnetic tape is inserted into the magnetic recording and reproducing device and taken out. That is, in one aspect, the magnetic recording and reproducing device can attachably and detachably include the magnetic tape cartridge. In another aspect, the magnetic recording medium is not treated as a replaceable medium, and the magnetic head and the magnetic recording medium are accommodated in the magnetic recording and reproducing device. In such an aspect, for example, the magnetic tape is accommodated in a reel in the magnetic recording and reproducing device comprising the magnetic head by being wound.

The magnetic recording and reproducing device can be, for example, a sliding type magnetic recording and reproducing device. The sliding type magnetic recording and reproducing device is a device in which the surface on the magnetic layer side and the magnetic head come into contact with each other to be slid on each other, in a case of performing recording of data on the magnetic recording medium and/or reproducing of the recorded data.

The magnetic recording and reproducing device may include a magnetic head. The magnetic head can be a recording head capable of performing the recording of data on the magnetic recording medium, and can also be a reproducing head capable of performing the reproducing of data recorded on the magnetic recording medium. In addition, in one aspect, the magnetic recording and reproducing device can include both a recording head and a reproducing head as separate magnetic heads. In another aspect, the magnetic head included in the magnetic recording and reproducing device can have a configuration in which both an element for recording data (recording element) and an element for reproducing data (reproducing element) are included in one magnetic head. Hereinafter, the element for recording data and the element for reproducing are collectively referred to as "elements for data". As the reproducing head, a magnetic head (MR head) including a magnetoresistive (MR) element capable of sensitively reading data recorded on the magnetic tape as a reproducing element is preferable. As the MR head, various well-known MR heads such as an Anisotropic Magnetoresistive (AMR) head, a Giant Magnetoresistive (GMR) head, or a Tunnel Magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing device. For example, a magnetic head that records data and/or reproduces recorded data (hereinafter also referred to as "recording and reproducing head") can include two servo signal reading elements, and the two servo signal reading elements can simultaneously read two adjacent servo bands. One or a plurality of elements for data can be disposed between the two servo signal reading elements.

In the magnetic recording and reproducing device, recording of data on the magnetic recording medium and/or reproducing of data recorded on the magnetic recording medium can be performed, for example, as the surface of the magnetic recording medium on the magnetic layer side and the magnetic head come into contact with each other to be slid on each other. The magnetic recording and reproducing device need only include the magnetic recording medium according to one aspect of the present invention, and a well-known technology can be applied to the others.

For example, in a case of recording data and/or reproducing recorded data, first, tracking using the servo signal is performed. That is, by causing the servo signal reading element to follow a predetermined servo track, the element for data is controlled to pass on the target data track. Displacement of the data track is performed by changing a servo track read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

EXAMPLES

Hereinafter, the present invention will be described based on Examples. Note that the present invention is not limited to the embodiments shown in Examples. "Parts" and "%" in the following description mean "parts by mass" and "mass %", unless otherwise specified. "eq" indicates equivalent and is a unit not convertible into SI unit. The steps and evaluations in the following description were performed in an environment of an atmosphere temperature of 23° C.±1° C., unless otherwise noted.

[Protrusion Forming Agent]

The protrusion forming agent shown in Table 1 is as follows. A protrusion forming agent 1 and a protrusion forming agent 3 are particles having a low surface smoothness of the particle surface. A particle shape of a protrusion forming agent 2 is a cocoon shape. A particle shape of a protrusion forming agent 4 is a so-called amorphous. A particle shape of a protrusion forming agent 5 is a shape close to a true sphere.

Protrusion forming agent 1: ATLAS (composite particle of silica and polymer) manufactured by Cabot Corporation, average particle size of 100 nm Protrusion forming agent 2: TGC6020N (silica particle) manufactured by Cabot Corporation, average particle size of 140 nm Protrusion forming agent 3: Cataloid (an aqueous dispersion sol of a silica particle; as a protrusion forming agent for preparing a protrusion forming agent liquid, a dry solid obtained by heating the aqueous dispersion sol to remove a solvent is used) manufactured by JGC Catalysts Co., Ltd., average particle size of 120 nm Protrusion forming agent 4: Asahi #50 (carbon black) manufactured by Asahi Carbon Co., Ltd., average particle size of 300 nm Protrusion forming agent 5: Quartron PL-10 L (an aqueous dispersion sol of a silica particle; as a protrusion forming agent for preparing a protrusion forming agent liquid, a dry solid obtained by heating the aqueous dispersion sol to remove a solvent is used) manufactured by FUSO CHEMICAL CO., LTD., average particle size of 130 nm Example 1

<Production of Ferromagnetic Powder No. 1>

Iron(III) nitrate nonahydrate (added amount: "amount of Fe nitrate" in Table 1), gallium(III) nitrate octahydrate (added amount: "amount of Ga nitrate" in Table 1), cobalt (II) nitrate hexahydrate (added amount: "amount of Co nitrate" in Table 1), titanium(IV) sulfate (added amount: "amount of Ti sulfate" in Table 1), and 16.7 g of polyvinylpyrrolidone (PVP) were dissolved in 90 g of pure water, and while the dissolved product was stirred using a magnetic stirrer, 44.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid aqueous solution obtained by dissolving 11 g of citric acid in 100 g of pure water was added to the obtained solution and stirred for 1 hour. The powder sedimented after stirring was collected by centrifugal separation, was washed with pure water, and was dried in a heating furnace at an in-furnace temperature of 80° C.

8900 g of pure water was added to the dried powder, and the powder was dispersed again in water to obtain dispersion liquid. The obtained dispersion liquid was heated to a liquid temperature of 50° C., and 440 g of an aqueous ammonia solution having a concentration of 25% was dropwise added with stirring. After stirring for 1 hour while maintaining the temperature at 50° C., 160 mL of tetraethoxysilane (TEOS) was dropwise added and was stirred for 24 hours. A powder sedimented by adding 500 g of ammonium sulfate to the obtained reaction solution was collected by centrifugal separation, was washed with pure water, and was dried in a heating furnace at an in-furnace temperature of 80° C. for 24 hours to obtain a ferromagnetic powder precursor.

The obtained ferromagnetic powder precursor was loaded into a heating furnace at an in-furnace temperature shown in Table 1 in an air atmosphere and was heat-treated for 4 hours.

The heat-treated powder was put into a 4 mol/L sodium hydroxide (NaOH) aqueous solution, and the mixture was stirred for 24 hours while maintaining the liquid temperature at 75° C. to perform the coat-removing step.

Thereafter, the ferromagnetic powder after the coat-removing step was collected by centrifugal separation, was washed with pure water, and was dried in a heating furnace at an in-furnace temperature of 95° C. After drying, a mill pulverizing step was executed under the conditions shown in Table 1 with an absolute mill (ABS-W manufactured by Osaka Chemical Co., Ltd.).

Composition confirmation of Ferromagnetic powder No. 1 obtained through the above steps was performed by high-frequency inductively coupled plasma-optical emission spectrometry (ICP-OES), and it was confirmed to be substitution type ε-iron oxide having the composition shown in Table 1. Values shown in Table 1 for the composition are the number ((2-x-y-z), x, y, z) of each element in a composition formula: $A^1_x A^2_y A^3_z Fe_{(2-x-y-z)} O_3$. In addition, scanning with CuKα rays was performed under conditions of a voltage of 45 kV and an intensity of 40 mA, an X-ray diffraction pattern was measured under the following conditions (X-ray diffraction analysis), and it was confirmed from a peak of the X-ray diffraction pattern that the obtained ferromagnetic powder had an ε phase crystal structure of a single phase (ε-iron oxide crystal structure) not including α phase and γ phase crystal structures.

PANalytical X'Pert Pro diffractometer, PIXcel detector
Soller slit of incident beam and diffraction beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees <Production of Magnetic Tape>
<<Composition for Forming a Magnetic Layer>>
(Magnetic Liquid)
  ε-Iron oxide powder (ferromagnetic powder shown in Table 1): 100.0 parts
  Sulfonic acid group-containing polyurethane resin: 15.0 parts
  Cyclohexanone: 150.0 parts
  Methyl ethyl ketone: 150.0 parts
(Abrasive Solution)
  α-Alumina (average particle size: 110 nm): 9.0 parts
  Vinyl chloride copolymer (MR110 manufactured by Kaneka Corporation): 0.7 parts
  Cyclohexanone: 20.0 parts
(Protrusion Forming Agent Liquid)
  Protrusion forming agent (see Table 1): 1.3 parts
  Methyl ethyl ketone: 9.0 parts
  Cyclohexanone: 6.0 parts
(Other Components)
  Lubricant: See Table 1 for type and amount
  Polyisocyanate (CORONATE manufactured by Tosoh Corporation): 2.5 parts
(Finishing Additive Solvent)
  Cyclohexanone: 180.0 parts
  Methyl ethyl ketone: 180.0 parts
<<Composition for Forming a Non-Magnetic Layer>>
  Non-magnetic inorganic powder (α-iron oxide): 80.0 parts
  (average particle size: 0.15 µm, average acicular ratio: 7, brunauer-emmett-teller (BET) specific surface area: 52 m²/g)
  Carbon black (average particle size: 20 nm): 20.0 parts
  Electron beam curable vinyl chloride copolymer: 13.0 parts
  Electron beam curable polyurethane resin: 6.0 parts
  Phenylphosphonic acid: 3.0 parts
  Cyclohexanone: 140.0 parts
  Methyl ethyl ketone: 170.0 parts
  Butyl stearate: 4.0 parts
  Stearic acid: 1.0 part
<Composition for Forming Back Coating Layer>
  Non-magnetic inorganic powder (α-iron oxide): 80.0 parts
  (average particle size: 0.15 µm, average acicular ratio: 7, BET specific surface area: 52 m²/g)
  Carbon black (average particle size: 20 nm): 20.0 parts
  Carbon black (average particle size: 100 nm): 3.0 parts
  Vinyl chloride copolymer: 13.0 parts Sulfonic acid group-containing polyurethane resin: 6.0 parts
Phenylphosphonic acid: 3.0 parts
Cyclohexanone: 140.0 parts
Methyl ethyl ketone: 170.0 parts
Stearic acid: 3.0 parts
Polyisocyanate (CORONATE manufactured by Tosoh Corporation): 5.0 parts
Methyl ethyl ketone: 400.0 parts <<Preparation of Composition for Forming Each Layer>>

A composition for forming a magnetic layer was prepared by the following method.

A magnetic liquid was prepared by dispersing various components of the magnetic liquid. The dispersion treatment was executed using a batch type vertical sand mill with the dispersion treatment conditions of the first pass and the second pass as the conditions shown in Table 1. Zirconia beads were used as the dispersion beads.

After mixing various components of the above-described abrasive solution, the mixture was put into a vertical sand mill disperser together with zirconia beads having a bead diameter of 1 mm, a ratio of the bead volume to the total of the abrasive solution volume and the bead volume was adjusted to be 60%, and subjected to a sand mill dispersion treatment for 180 minutes. The liquid after the sand mill dispersion treatment was taken out and subjected to an ultrasonic dispersion filtration treatment using a flow type ultrasonic dispersion filtration device to prepare an abrasive solution.

The various components of the above protrusion forming agent liquid were mixed and then the mixture was subjected to an ultrasonic treatment (dispersion treatment) for 60 minutes at an ultrasonic output of 500 watts per 200 cc by a horn type ultrasonic disperser, and the obtained dispersion liquid was filtered using a filter having a pore diameter of 0.5 Thereby, a protrusion forming agent liquid was prepared.

The magnetic liquid, the abrasive solution, the protrusion forming agent liquid, other components, and the finishing additive solvent were introduced into a dissolver stirrer, and the mixture was stirred at a circumferential speed of 10 m/sec for 30 minutes. After that, a dispersion treatment of 2 passes was performed at a flow rate of 7.5 kg/min by a flow type ultrasonic disperser, and then the obtained liquid was filtered once through a filter having a pore diameter of 1.0 Thereby, a composition for forming a magnetic layer was prepared.

A composition for forming a non-magnetic layer was prepared by the following method.

The components excluding a lubricant (butyl stearate and stearic acid) were kneaded and diluted by an open kneader, and then subjected to a dispersion treatment by a horizontal beads mill disperser. After that, the lubricant (butyl stearate and stearic acid) was added into the obtained dispersion liquid and stirred and mixed by a dissolver stirrer to prepare a composition for forming a non-magnetic layer.

A composition for forming a back coating layer was prepared by the following method.

The components excluding a lubricant (stearic acid), polyisocyanate, and methyl ethyl ketone (400.0 parts) were kneaded and diluted by an open kneader, and then subjected to a dispersion treatment by a horizontal beads mill disperser. After that, the lubricant (stearic acid), polyisocyanate, and methyl ethyl ketone (400.0 parts) were added into the obtained dispersion liquid and stirred and mixed by a dissolver stirrer to prepare a composition for forming a back coating layer.

<<Production of Magnetic Tape>>

The composition for forming a non-magnetic layer was applied onto a surface of a biaxially stretched polyethylene naphthalate support having a thickness of 5.0 μm and dried so that the thickness after drying was 1.0 μm, and then, an electron beam was emitted at an acceleration voltage of 125 kV to obtain an energy of 40 kGy. A composition for forming a magnetic layer was applied thereonto so that the thickness after drying was 50 nm, to form a coating layer. While the coating layer is wet, a vertical alignment treatment was performed by applying a magnetic field having a magnetic field intensity of 0.6 T in an alignment zone in a direction perpendicular to a surface of the coating layer. Immediately after that, an electric field having the electric field strength shown in Table 1 was applied perpendicularly to the surface of the coating layer by the positive electrode arranged on the coating layer side and the negative electrode arranged on the opposite side, and then dried. Thereby, a magnetic layer was formed. Thereafter, the composition for forming a back coating layer was applied onto a surface of the support opposite to the surface on which the non-magnetic layer and the magnetic layer are formed, so that the thickness after drying was 0.5 μm, and dried. Thereby, a back coating layer was formed.

After that, a surface smoothing treatment (calendering treatment) was performed using a calender roll formed of only metal rolls at a calendering treatment speed of 80 m/min, a linear pressure of 300 kg/cm (294 kN/m), and a surface temperature of the calender roll of 110° C.

After that, a heat treatment was performed for 36 hours in an environment of an atmosphere temperature of 70° C. After the heat treatment, the resultant was slit to have ½ inches (0.0127 meters) width, and the magnetic layer surface was cleaned with a tape cleaning device in which a non-woven fabric and a razor blade are attached to a device including a feeding and winding device of the slit so as to press the magnetic layer surface. After that, in a state where the magnetic layer of the magnetic tape was demagnetized, a servo pattern having disposition and a shape according to the linear tape-open (LTO) Ultrium format was formed on the magnetic layer by using a servo write head mounted on a servo writer. In this way, a magnetic tape including a data band, a servo band, and a guide band in the disposition according to the LTO Ultrium format in the magnetic layer and including a servo pattern having the disposition and the shape according to the LTO Ultrium format on the servo band was obtained.

Examples 2 to 36 and Comparative Examples 1 to 8

A ferromagnetic powder was produced and a magnetic tape was produced by the same method described for Example 1, except that items shown in Table 1 were changed as shown in Table 1. Regarding Ferromagnetic powder No. 8, "amount of Al nitrate" in Table 1 indicates an amount of aluminum(III) nitrate nonahydrate. In Table 1, for Comparative Examples in which "0.0" was indicated in the row of electric field strength, the electric field application treatment was not executed during the production of the magnetic tape.

Composition confirmation of the ferromagnetic powders No. 2 to No. 12 in Table 1 was also performed by ICP-OES, and it was confirmed that the ferromagnetic powders No. 2 to No. 8 and No. 10 to No. 12 were substitution type ε-iron oxide having the composition shown in Table 1, and that the ferromagnetic powder No. 9 was non-substitution type ε-iron oxide. In addition, scanning with CuKα rays was performed under conditions of a voltage of 45 kV and an intensity of 40 mA, an X-ray diffraction pattern was measured under the conditions described above (X-ray diffraction analysis), and it was confirmed from a peak of the X-ray diffraction pattern that the obtained ferromagnetic powder had an ε phase crystal structure of a single phase (ε-iron oxide crystal structure) not including α phase and γ phase crystal structures.

An average particle size of Ferromagnetic powders described above was obtained by the method described above using transmission electron microscope H-9000 manufactured by Hitachi, Ltd. as a transmission electron microscope, and using image analysis software KS-400 manufactured by Carl Zeiss as image analysis software. The obtained average particle size is shown in Table 1 as a ferromagnetic powder size.

[Evaluation Method]

(1) Intensity Ratio after Pressing (Int1/Int2)

Each magnetic tape of Examples and Comparative Examples was passed between two rolls (without heating the rolls) six times in total while running the magnetic tape in the longitudinal direction at a speed of 20 m/min in a state where a tension of 0.5 N/m was applied, by using a calendering treatment device comprising a 7-step calender roll configured of only a metal roll in an environment of an atmosphere temperature of 20° C. to 25° C. and a relative humidity of 40% to 60%, and accordingly, the pressing was performed by applying a surface pressure of 70 atm to the surface of each magnetic layer, in a case of the passing between the rolls.

A tape sample was cut out from the magnetic tape after the pressing. The tape sample used in the following section (2) was further cut out from the remaining magnetic tape from which the tape sample was cut out.

Regarding the cut-out tape sample, the magnetic layer surface was irradiated with X-ray by using a thin-film X-ray diffractometer (SmartLab manufactured by Rigaku Corporation), and the In-Plane XRD was performed by the method described above. Int1 and Int2 were obtained from the X-ray diffraction spectrum obtained by the In-Plane XRD, and the intensity ratio (Int1/Int2) was calculated from the obtained values. The calculated value is shown in Table 1 as "(Int1/Int2) after pressing".

(2) Evaluation of Running Stability after Pressing at Pressure of 70 atm

Regarding each magnetic tape of Examples and Comparative Examples, a position error signal (PES) was obtained by the following method using the tape sample cut out from the magnetic tape after the pressing in the section (1).

The servo pattern was read by a verify head on the servo writer used to form the servo pattern. The verify head is a reading magnetic head for confirming the quality of the servo pattern formed on the magnetic tape, and an element for reading is disposed at a position corresponding to the position of the servo pattern (position of the magnetic tape in the width direction), in the same manner as the magnetic head of a well-known magnetic recording and reproducing device (drive).

A well-known PES arithmetic circuit which calculates a head positioning accuracy of a servo system as PES from an electric signal obtained by reading the servo pattern by the verify head is connected to the verify head. The PES arithmetic circuit calculated a displacement from the input electric signal (pulse signal) in the width direction of the magnetic tape, as required, and a value obtained by applying a high pass filter (cutoff: 500 cycles/m) with respect to temporal change information (signal) of the displacement was calculated as PES. The PES can be an index of running stability and it is possible to evaluate that the running stability is excellent, in a case where the PES calculated described above is equal to or smaller than 18 nm.

The above results are shown in Table 1 (Tables 1-1 to 1-7).

TABLE 1-1

| | | | Unit | Example 1 | Example 2 | Example 3 |
|---|---|---|---|---|---|---|
| Ferromagnetic powder | Ferromagnetic powder No. | | — | 1 | 2 | 2 |
| | Raw material | Amount of Fe nitrate | g | 92.2 | 92.2 | 92.2 |
| | | Amount of Ga nitrate | g | 14.4 | 14.4 | 14.4 |
| | | Amount of Al nitrate | g | 0.0 | 0.0 | 0.0 |
| | | Amount of Co nitrate | g | 2.1 | 2.1 | 2.1 |
| | | Amount of Ti sulfate | g | 1.7 | 1.7 | 1.7 |
| | Composition | | — | Fe:Ga:Co:Ti 1.62:0.28:0.05:0.05 | Fe:Ga:Co:Ti 1.62:0.28:0.05:0.05 | Fe:Ga:Co:Ti 1.62:0.28:0.05:0.05 |
| | In-furnace temperature during heat treatment | | ° C. | 1000 | 1000 | 1020 |
| | 1st pulverization | Rotation speed | rpm | 5000 | 5000 | 5000 |
| | | Time | Minutes | 3 | 4 | 5 |
| | 2nd pulverization | Rotation speed | rpm | 10000 | 10000 | 10000 |
| | | Time | Minutes | 1 | 2 | 2 |
| | Ferromagnetic powder size | | nm | 11.5 | 11.4 | 11.4 |
| Lubricant in composition for forming magnetic layer | Stearic acid | | Parts | 1.0 | 1.0 | 1.0 |
| | Butyl stearate | | Parts | 1.0 | 1.0 | 1.0 |
| | Stearic acid amide | | Parts | — | — | — |
| Dispersion condition | 1st pass | Bead diameter | mm | 0.5 | 0.5 | 0.5 |
| | | Time | Hours | 3 | 3 | 5 |
| | 2nd pass | Bead diameter | mm | 0.3 | 0.3 | 0.3 |
| | | Time | Hours | 3 | 3 | 5 |
| Electric field application treatment | Electric field strength | | kV/mm | 1.2 | 1.4 | 1.6 |

TABLE 1-1-continued

|  |  |  | | | |
|---|---|---|---|---|---|
| | Protrusion forming agent | — | — | Protrusion forming agent 1 | Protrusion forming agent 1 | Protrusion forming agent 1 |
| Evaluation result | Intensity ratio after pressing (Int1/Int2) | — | — | 3.4 | 5.0 | 6.5 |
| | PES | nm | | 11.0 | 11.0 | 17.0 |

| | | Unit | Example 4 | Example 5 | Example 6 |
|---|---|---|---|---|---|
| Ferromagnetic powder | Ferromagnetic powder No. | — | 3 | 3 | 4 |
| | Raw material Amount of Fe nitrate | g | 92.2 | 92.2 | 92.2 |
| | Amount of Ga nitrate | g | 14.4 | 14.4 | 14.4 |
| | Amount of Al nitrate | g | 0.0 | 0.0 | 0.0 |
| | Amount of Co nitrate | g | 2.1 | 2.1 | 2.1 |
| | Amount of Ti sulfate | g | 1.7 | 1.7 | 1.7 |
| | Composition | — | Fe:Ga:Co:Ti 1.62:0.23:0.05:0.05 | Fe:Ga:Co:Ti 1.62:0.28:0.05:0.05 | Fe:Ga:Co:Ti 1.62:0.28:0.05:0.05 |
| | In-furnace temperature during heat treatment | °C. | 1015 | 1020 | 1020 |
| | 1st pulverization Rotation speed | rpm | 5000 | 5000 | 5000 |
| | Time | Minutes | 1 | 1 | 3 |
| | 2nd pulverization Rotation speed | rpm | 10000 | 10000 | 10000 |
| | Time | Minutes | 1 | 0.5 | 1 |
| | Ferromagnetic powder size | nm | 11.8 | 11.8 | 14.2 |
| Lubricant in composition for forming magnetic layer | Stearic acid | Parts | 1.0 | 1.0 | 1.0 |
| | Butyl stearate | Parts | 1.0 | 1.0 | 1.0 |
| | Stearic acid amide | Parts | — | — | — |
| Dispersion condition | 1st pass Bead diameter | mm | 0.5 | 0.5 | 0.5 |
| | Time | Hours | 3 | 2 | 3 |
| | 2nd pass Bead diameter | mm | 0.3 | 0.3 | 0.3 |
| | Time | Hours | 3 | 2 | 3 |
| Electric field application treatment | Electric field strength | kV/mm | 1.0 | 0.8 | 1.2 |
| | Protrusion forming agent | — | Protrusion forming agent 1 | Protrusion forming agent 1 | Protrusion forming agent 1 |
| Evaluation result | Intensity ratio after pressing (Int1/Int2) | — | 2.6 | 1.4 | 3.9 |
| | PES | nm | 14.0 | 17.0 | 11.0 |

TABLE 1-2

| | | Unit | Example 7 | Example 8 | Example 9 |
|---|---|---|---|---|---|
| Ferromagnetic powder | Ferromagnetic powder No. | — | 5 | 6 | 7 |
| | Raw material Amount of Fe nitrate | g | 92.2 | 103.0 | 89.4 |
| | Amount of Ga nitrate | g | 14.4 | 7.7 | 22.1 |
| | Amount of Al nitrate | g | 0.0 | 0.0 | 0.0 |
| | Amount of Co nitrate | g | 2.1 | 0.8 | 0.0 |
| | Amount of Ti sulfate | g | 1.7 | 0.7 | 0.0 |
| | Composition | — | Fe:Ga:Co:Ti 1.62:0.28:0.05:0.05 | Fe:Ga:Co:Ti 1.81:0.15:0.02:0.02 | Fe:Ga:Co:Ti 1.57:0.43:0:0 |
| | In-furnace temperature during heat treatment | °C. | 980 | 1000 | 1000 |
| | 1st pulverization Rotation speed | rpm | 5000 | 5000 | 5000 |
| | Time | Minutes | 3 | 3 | 3 |
| | 2nd pulverization Rotation speed | rpm | 10000 | 10000 | 10000 |
| | Time | Minutes | 1 | 1 | 1 |
| | Ferromagnetic powder size | nm | 9.8 | 11.7 | 11.5 |
| Lubricant in composition for forming magnetic layer | Stearic acid | Parts | 1.0 | 1.0 | 1.0 |
| | Butyl stearate | Parts | 1.0 | 1.0 | 1.0 |
| | Stearic acid amide | Parts | — | — | — |
| Dispersion condition | 1st pass Bead diameter | mm | 0.5 | 0.5 | 0.5 |
| | Time | Hours | 3 | 3 | 3 |
| | 2nd pass Bead diameter | mm | 0.3 | 0.3 | 0.3 |
| | Time | Hours | 3 | 3 | 3 |

TABLE 1-2-continued

| | | | | | |
|---|---|---|---|---|---|
| Electric field application treatment | Electric field strength | kV/mm | 1.2 | 1.2 | 1.2 |
| | Protrusion forming agent | — | Protrusion forming agent 1 | Protrusion forming agent 1 | Protrusion forming agent 1 |
| Evaluation result | Intensity ratio after pressing (Int1/Int2) | — | 3.1 | 3.7 | 3.7 |
| | PES | nm | 12.0 | 11.0 | 11.0 |

| | | Unit | Example 10 | Example 11 | Example 12 |
|---|---|---|---|---|---|
| Ferromagnetic powder | Ferromagnetic powder No. | — | 8 | 9 | 1 |
| | Raw material Amount of Fe nitrate | g | 92.8 | 113.8 | 92.2 |
| | Amount of Ga nitrate | g | 0.0 | 0.0 | 14.4 |
| | Amount of Al nitrate | g | 13.0 | 0.0 | 0.0 |
| | Amount of Co nitrate | g | 2.1 | 0.0 | 2.1 |
| | Amount of Ti sulfate | g | 1.7 | 0.0 | 1.7 |
| | Composition | — | Fe:Al:Co:Ti 1.63:0.27:0.05:0.05 | Fe:Ga:Co:Ti 2.00:0:0:0 | Fe:Ga:Co:Ti 1.62:0.28:0.05:0.05 |
| | In-furnace temperature during heat treatment | °C. | 1000 | 1000 | 1000 |
| | 1st pulverization Rotation speed | rpm | 5000 | 5000 | 5000 |
| | Time | Minutes | 3 | 3 | 3 |
| | 2nd pulverization Rotation speed | rpm | 10000 | 10000 | 10000 |
| | Time | Minutes | 1 | 1 | 1 |
| | Ferromagnetic powder size | nm | 11.5 | 11.4 | 11.5 |
| Lubricant in composition for forming magnetic layer | Stearic acid | Parts | 1.0 | 1.0 | — |
| | Butyl stearate | Parts | 1.0 | 1.0 | 1.0 |
| | Stearic acid amide | Parts | — | — | 1.0 |
| Dispersion condition | 1st pass Bead diameter | mm | 0.5 | 0.5 | 0.5 |
| | Time | Hours | 3 | 3 | 3 |
| | 2nd pass Bead diameter | mm | 0.3 | 0.3 | 0.3 |
| | Time | Hours | 3 | 3 | 3 |
| Electric field application treatment | Electric field strength | kV/mm | 1.2 | 1.2 | 1.2 |
| | Protrusion forming agent | — | Protrusion forming agent 1 | Protrusion forming agent 1 | Protrusion forming agent 1 |
| Evaluation result | Intensity ratio after pressing (Int1/Int2) | — | 3.0 | 4.2 | 3.3 |
| | PES | nm | 12.0 | 11.0 | 11.0 |

TABLE 1-3

| | | Unit | Example 13 | Example 14 | Example 15 |
|---|---|---|---|---|---|
| Ferromagnetic powder | Ferromagnetic powder No. | — | 1 | 2 | 2 |
| | Raw material Amount of Fe nitrate | g | 92.2 | 92.2 | 92.2 |
| | Amount of Ga nitrate | g | 14.4 | 14.4 | 14.4 |
| | Amount of Al nitrate | g | 0.0 | 0.0 | 0.0 |
| | Amount of Co nitrate | g | 2.1 | 2.1 | 2.1 |
| | Amount of Ti sulfate | g | 1.7 | 1.7 | 1.7 |
| | Composition | — | Fe:Ga:Co:Ti 1.62:0.28:0.05:0.05 | Fe:Ga:Co:Ti 1.62:0.28:0.05:0.05 | Fe:Ga:Co:Ti 1.62:0.28:0.05:0.05 |
| | In-furnace temperature during heat treatment | °C. | 1000 | 1000 | 1020 |
| | 1st pulverization Rotation speed | rpm | 5000 | 5000 | 5000 |
| | Time | Minutes | 3 | 4 | 4 |
| | 2nd pulverization Rotation speed | rpm | 10000 | 10000 | 10000 |
| | Time | Minutes | 1 | 2 | 2 |
| | Ferromagnetic powder size | nm | 11.5 | 11.4 | 11.4 |
| Lubricant in composition for forming magnetic layer | Stearic acid | Parts | 1.0 | 1.0 | 1.0 |
| | Butyl stearate | Parts | 1.0 | 1.0 | 1.0 |
| | Stearic acid amide | Parts | — | — | — |
| Dispersion | 1st pass Bead diameter | mm | 0.5 | 0.5 | 0.5 |

TABLE 1-3-continued

| | | | | | | |
|---|---|---|---|---|---|---|
| condition | | Time | Hours | 3 | 3 | 5 |
| | 2nd pass | Bead diameter | mm | 0.3 | 0.3 | 0.3 |
| | | Time | Hours | 3 | 3 | 5 |
| Electric field application treatment | Electric field strength | | kV/mm | 1.2 | 1.4 | 1.6 |
| | Protrusion forming agent | | — | Protrusion forming agent 2 | Protrusion forming agent 2 | Protrusion forming agent 2 |
| Evaluation result | Intensity ratio after pressing (Int1/Int2) | | — | 3.3 | 4.8 | 6.2 |
| | PES | | nm | 11.0 | 11.0 | 16.0 |

| | | | Unit | Example 16 | Example 17 | Example 18 |
|---|---|---|---|---|---|---|
| Ferromagnetic powder | Ferromagnetic powder No. | | — | 3 | 3 | 4 |
| | Raw material | Amount of Fe nitrate | g | 92.2 | 92.2 | 92.2 |
| | | Amount of Ga nitrate | g | 14.4 | 14.4 | 14.4 |
| | | Amount of Al nitrate | g | 0.0 | 0.0 | 0.0 |
| | | Amount of Co nitrate | g | 2.1 | 2.1 | 2.1 |
| | | Amount of Ti sulfate | g | 1.7 | 1.7 | 1.7 |
| | | Composition | — | Fe:Ga:Co:Ti 1.62:0.28:0.05:0.05 | Fe:Ga:Co:Ti 1.62:0.28:0.05:0.05 | Fe:Ga:Co:Ti 1.62:0.28:0.05:0.05 |
| | | In-furnace temperature during heat treatment | ° C. | 1015 | 1020 | 1020 |
| | 1st pulverization | Rotation speed | rpm | 5000 | 5000 | 5000 |
| | | Time | Minutes | 1 | 1 | 3 |
| | 2nd pulverization | Rotation speed | rpm | 10000 | 10000 | 10000 |
| | | Time | Minutes | 1 | 1 | 1 |
| | Ferromagnetic powder size | | nm | 11.8 | 11.8 | 14.2 |
| Lubricant in composition for forming magnetic layer | Stearic acid | | Parts | 1.0 | 1.0 | 1.0 |
| | Butyl stearate | | Parts | 1.0 | 1.0 | 1.0 |
| | Stearic acid amide | | Parts | — | — | — |
| Dispersion condition | 1st pass | Bead diameter | mm | 0.5 | 0.5 | 0.5 |
| | | Time | Hours | 3 | 3 | 3 |
| | 2nd pass | Bead diameter | mm | 0.3 | 0.3 | 0.3 |
| | | Time | Hours | 3 | 3 | 5 |
| Electric field application treatment | Electric field strength | | kV/mm | 1.0 | 0.8 | 1.2 |
| | Protrusion forming agent | | — | Protrusion forming agent 2 | Protrusion forming agent 2 | Protrusion forming agent 2 |
| Evaluation result | Intensity ratio after pressing (Int1/Int2) | | — | 2.3 | 1.2 | 3.6 |
| | PES | | nm | 14.0 | 17.0 | 12.0 |

TABLE 1-4

| | | | Unit | Example 19 | Example 20 | Example 21 |
|---|---|---|---|---|---|---|
| Ferromagnetic powder | Ferromagnetic powder No. | | — | 5 | 6 | 7 |
| | Raw material | Amount of Fe nitrate | g | 92.2 | 103.0 | 89.4 |
| | | Amount of Ga nitrate | g | 14.4 | 7.7 | 22.1 |
| | | Amount of Al nitrate | g | 0.0 | 0.0 | 0.0 |
| | | Amount of Co nitrate | g | 2.1 | 0.8 | 0.0 |
| | | Amount of Ti sulfate | g | 1.7 | 0.7 | 0.0 |
| | | Composition | — | Fe:Ga:Co:Ti 1.62:0.28:0.05:0.05 | Fe:Ga:Co:Ti 1.81:0.15:0.02:0.02 | Fe:Ga:Co:Ti 1.57:0.43:0:0 |
| | | In-furnace temperature during heat treatment | ° C. | 980 | 1000 | 1000 |
| | 1st pulverization | Rotation speed | rpm | 5000 | 5000 | 5000 |
| | | Time | Minutes | 3 | 3 | 3 |
| | 2nd pulverization | Rotation speed | rpm | 10000 | 10000 | 10000 |
| | | Time | Minutes | 1 | 1 | 1 |
| | Ferromagnetic powder size | | nm | 9.8 | 11.7 | 11.5 |
| Lubricant in composition for | Stearic acid | | Parts | 1.0 | 1.0 | 1.0 |
| | Butyl stearate | | Parts | 1.0 | 1.0 | 1.0 |

TABLE 1-4-continued

|  |  |  | Unit |  |  |  |
|---|---|---|---|---|---|---|
| forming magnetic layer | Stearic acid amide |  | Parts | — | — | — |
| Dispersion condition | 1st pass | Bead diameter | mm | 0.5 | 0.5 | 0.5 |
|  |  | Time | Hours | 3 | 3 | 3 |
|  | 2nd pass | Bead diameter | mm | 0.3 | 0.3 | 0.3 |
|  |  | Time | Hours | 3 | 3 | 3 |
| Electric field application treatment | Electric field strength |  | kV/mm | 1.2 | 1.2 | 1.2 |
|  | Protrusion forming agent |  | — | Protrusion forming agent 2 | Protrusion forming agent 2 | Protrusion forming agent 2 |
| Evaluation result | Intensity ratio after pressing (Int1/Int2) |  | — | 2.9 | 3.6 | 3.7 |
|  | PES |  | nm | 12.0 | 12.0 | 11.0 |

|  |  |  | Unit | Example 22 | Example 23 | Example 24 |
|---|---|---|---|---|---|---|
| Ferromagnetic powder | Ferromagnetic powder No. |  | — | 8 | 9 | 1 |
|  | Raw material | Amount of Fe nitrate | g | 92.8 | 123.8 | 92.2 |
|  |  | Amount of Ga nitrate | g | 0.0 | 0.0 | 14.4 |
|  |  | Amount of Al nitrate | g | 13.0 | 0.0 | 0.0 |
|  |  | Amount of Co nitrate | g | 2.1 | 0.0 | 2.1 |
|  |  | Amount of Ti sulfate | g | 1.7 | 0.0 | 1.7 |
|  | Composition |  | — | Fe:Al:Co:Ti 1.63:0.27:0.05:0.05 | Fe:Ga:Co:Ti 2.00:0:0:0 | Fe:Ga:Co:Ti 1.62:0.28:0.05:0.05 |
|  | In-furnace temperature during heat treatment |  | ° C. | 1000 | 1000 | 1000 |
|  | 1st pulverization | Rotation speed | rpm | 5000 | 5000 | 5000 |
|  |  | Time | Minutes | 3 | 3 | 3 |
|  | 2nd pulverization | Rotation speed | rpm | 10000 | 10000 | 10000 |
|  |  | Time | Minutes | 1 | 1 | 1 |
|  | Ferromagnetic powder size |  | nm | 11.5 | 11.4 | 11.5 |
| Lubricant in composition for forming magnetic layer | Stearic acid |  | Parts | 1.0 | 1.0 | — |
|  | Butyl stearate |  | Parts | 1.0 | 1.0 | 1.0 |
|  | Stearic acid amide |  | Parts | — | — | 1.0 |
| Dispersion condition | 1st pass | Bead diameter | mm | 0.5 | 0.5 | 0.5 |
|  |  | Time | Hours | 3 | 3 | 3 |
|  | 2nd pass | Bead diameter | mm | 0.3 | 0.3 | 0.3 |
|  |  | Time | Hours | 3 | 3 | 3 |
| Electric field application treatment | Electric field strength |  | kV/mm | 1.2 | 1.2 | 1.2 |
|  | Protrusion forming agent |  | — | Protrusion forming agent 2 | Protrusion forming agent 2 | Protrusion forming agent 2 |
| Evaluation result | Intensity ratio after pressing (Int1/Int2) |  | — | 2.8 | 4.1 | 3.3 |
|  | PES |  | nm | 11.0 | 12.0 | 11.0 |

TABLE 1-5

|  |  |  | Unit | Example 25 | Example 26 | Example 27 |
|---|---|---|---|---|---|---|
| Ferromagnetic powder | Ferromagnetic powder No. |  | — | 1 | 2 | 2 |
|  | Raw material | Amount of Fe nitrate | g | 92.2 | 92.2 | 92.2 |
|  |  | Amount of Ga nitrate | g | 14.4 | 14.4 | 14.4 |
|  |  | Amount of Al nitrate | g | 0.0 | 0.0 | 0.0 |
|  |  | Amount of Co nitrate | g | 2.1 | 2.1 | 2.1 |
|  |  | Amount of Ti sulfate | g | 1.7 | 1.7 | 1.7 |
|  | Composition |  | — | Fe:Ga:Co:Ti 1.62:0.28:0.05:0.05 | Fe:Ga:Co:Ti 1.62:0.28:0.05:0.05 | Fe:Ga:Co:Ti 1.62:0.28:0.05:0.05 |
|  | In-furnace temperature during heat treatment |  | ° C. | 1000 | 1000 | 1020 |
|  | 1st pulverization | Rotation speed | rpm | 5000 | 5000 | 5000 |
|  |  | Time | Minutes | 3 | 4 | 4 |
|  | 2nd | Rotation speed | rpm | 10000 | 10000 | 10000 |

TABLE 1-5-continued

|  |  | Unit | | | |
|---|---|---|---|---|---|
| | pulverization Time | Minutes | 1 | 2 | 2 |
| | Ferromagnetic powder size | nm | 11.5 | 11.4 | 11.4 |
| Lubricant in composition for forming magnetic layer | Stearic acid | Parts | 1.0 | 1.0 | 1.0 |
| | Butyl stearate | Parts | 1.0 | 1.0 | 1.5 |
| | Stearic acid amide | Parts | — | — | — |
| Dispersion condition | 1st pass Bead diameter | mm | 0.5 | 0.5 | 0.5 |
| | Time | Hours | 3 | 3 | 5 |
| | 2nd pass Bead diameter | mm | 0.3 | 0.3 | 0.3 |
| | Time | Hours | 3 | 3 | 5 |
| Electric field application treatment | Electric field strength | kV/mm | 1.2 | 1.4 | 1.6 |
| | Protrusion forming agent | — | Protrusion forming agent 3 | Protrusion forming agent 3 | Protrusion forming agent 3 |
| Evaluation result | Intensity ratio after pressing (Int1/Int2) | — | 3.0 | 4.6 | 6.1 |
| | PES | nm | 12.0 | 11.0 | 17.0 |

|  |  | Unit | Example 28 | Example 29 | Example 30 |
|---|---|---|---|---|---|
| Ferromagnetic powder | Ferromagnetic powder No. | — | 3 | 3 | 4 |
| | Raw material Amount of Fe nitrate | g | 92.2 | 92.2 | 92.2 |
| | Amount of Ga nitrate | g | 14.4 | 14.4 | 14.4 |
| | Amount of Al nitrate | g | 0.0 | 0.0 | 0.0 |
| | Amount of Co nitrate | g | 2.1 | 2.1 | 2.1 |
| | Amount of Ti sulfate | g | 1.7 | 1.7 | 1.7 |
| | Composition | — | Fe:Ga:Co:Ti 1.62:0.28:0.05:0.05 | Fe:Ga:Co:Ti 1.62:0.28:0.05:0.05 | Fe:Ga:Co:Ti 1.62:0.28:0.05:0.05 |
| | In-furnace temperature during heat treatment | ° C. | 1015 | 1020 | 1020 |
| | 1st pulverization Rotation speed | rpm | 5000 | 5000 | 5000 |
| | Time | Minutes | 1 | 1 | 3 |
| | 2nd pulverization Rotation speed | rpm | 10000 | 10000 | 10000 |
| | Time | Minutes | 1 | 1 | 1 |
| | Ferromagnetic powder size | nm | 11.8 | 11.8 | 14.2 |
| Lubricant in composition for forming magnetic layer | Stearic acid | Parts | 1.0 | 1.0 | 1.0 |
| | Butyl stearate | Parts | 1.0 | 1.0 | 1.0 |
| | Stearic acid amide | Parts | — | — | — |
| Dispersion condition | 1st pass Bead diameter | mm | 0.5 | 0.5 | 0.5 |
| | Time | Hours | 3 | 3 | 3 |
| | 2nd pass Bead diameter | mm | 0.3 | 0.3 | 0.3 |
| | Time | Hours | 3 | 3 | 3 |
| Electric field application treatment | Electric field strength | kV/mm | 1.0 | 0.8 | 1.2 |
| | Protrusion forming agent | — | Protrusion forming agent 3 | Protrusion forming agent 3 | Protrusion forming agent 3 |
| Evaluation result | Intensity ratio after pressing (Int1/Int2) | — | 2.3 | 1.0 | 3.4 |
| | PES | nm | 14.0 | 16.0 | 11.0 |

TABLE 1-6

|  |  | Unit | Example 31 | Example 32 | Example 33 |
|---|---|---|---|---|---|
| Ferromagnetic powder | Ferromagnetic powder No. | — | 5 | 6 | 7 |
| | Raw material Amount of Fe nitrate | g | 92.2 | 103.0 | 89.4 |
| | Amount of Ga nitrate | g | 14.4 | 7.7 | 22.1 |
| | Amount of Al nitrate | g | 0.0 | 0.0 | 0.0 |
| | Amount of Co nitrate | g | 2.1 | 0.8 | 0.0 |
| | Amount of Ti sulfate | g | 1.7 | 0.7 | 0.0 |
| | Composition | — | Fe:Ga:Co:Ti 1.62:0.28:0.05:0.05 | Fe:Ga:Co:Ti 1.81:0.15:0.02:0.02 | Fe:Ga:Co:Ti 1.57:0.43:0:0 |
| | In-furnace temperature during heat treatment | ° C. | 980 | 1000 | 1000 |

TABLE 1-6-continued

| | | | | | | |
|---|---|---|---|---|---|---|
| | 1st pulverization | Rotation speed | rpm | 5000 | 5000 | 5000 |
| | | Time | Minutes | 3 | 3 | 3 |
| | 2nd pulverization | Rotation speed | rpm | 10000 | 10000 | 10000 |
| | | Time | Minutes | 1 | 1 | 1 |
| | Ferromagnetic powder size | | nm | 9.8 | 11.7 | 11.5 |
| Lubricant in composition for forming magnetic layer | Stearic acid | | Parts | 1.0 | 1.0 | 1.0 |
| | Butyl stearate | | Parts | 1.0 | 1.0 | 1.0 |
| | Stearic acid amide | | Parts | — | — | — |
| Dispersion condition | 1st pass | Bead diameter | mm | 0.5 | 0.5 | 0.5 |
| | | Time | Hours | 3 | 3 | 3 |
| | 2nd pass | Bead diameter | mm | 0.3 | 0.3 | 0.3 |
| | | Time | Hours | 3 | 3 | 3 |
| Electric field application treatment | Electric field strength | | kV/mm | 1.2 | 1.2 | 1.2 |
| | Protrusion forming agent | | — | Protrusion forming agent 3 | Protrusion forming agent 3 | Protrusion forming agent 3 |
| Evaluation result | Intensity ratio after pressing (Int1/Int2) | | — | 2.7 | 3.2 | 3.6 |
| | PES | | nm | 11.0 | 12.0 | 11 0 |

| | | | Unit | Example 34 | Example 35 | Example 36 |
|---|---|---|---|---|---|---|
| Ferromagnetic powder | Ferromagnetic powder No. | | — | 8 | 9 | 1 |
| | Raw material | Amount of Fe nitrate | g | 92.8 | 113.8 | 92.2 |
| | | Amount of Ga nitrate | g | 0.0 | 0.0 | 14.4 |
| | | Amount of Al nitrate | g | 13.0 | 0.0 | 0.0 |
| | | Amount of Co nitrate | g | 2.1 | 0.0 | 2.1 |
| | | Amount of Ti sulfate | g | 1.7 | 0.0 | 1.7 |
| | | Composition | — | Fe:Al:Co:Ti 1.63:0.27:0.05:0.05 | Fe:Ga:Co:Ti 2.00:0:0:0 | Fe:Ga:Co:Ti 1.62:0.28:0.05:0.05 |
| | In-furnace temperature during heat treatment | | ° C. | 1000 | 1000 | 1000 |
| | 1st pulverization | Rotation speed | rpm | 5000 | 5000 | 5000 |
| | | Time | Minutes | 3 | 3 | 3 |
| | 2nd pulverization | Rotation speed | rpm | 10000 | 10000 | 10000 |
| | | Time | Minutes | 1 | 1 | 1 |
| | Ferromagnetic powder size | | nm | 11.5 | 11.4 | 11.5 |
| Lubricant in composition for forming magnetic layer | Stearic acid | | Parts | 1.0 | 1.0 | — |
| | Butyl stearate | | Parts | 1.0 | 1.0 | 1.0 |
| | Stearic acid amide | | Parts | — | — | 1.0 |
| Dispersion condition | 1st pass | Bead diameter | mm | 0.5 | 0.5 | 0.5 |
| | | Time | Hours | 3 | 3 | 3 |
| | 2nd pass | Bead diameter | mm | 0.3 | 0.3 | 0.3 |
| | | Time | Hours | 3 | 3 | 3 |
| Electric field application treatment | Electric field strength | | kV/mm | 1.2 | 1.2 | 1.2 |
| | Protrusion forming agent | | — | Protrusion forming agent 3 | Protrusion forming agent 3 | Protrusion forming agent 3 |
| Evaluation result | Intensity ratio after pressing (Int1/Int2) | | — | 2.7 | 3.8 | 3.4 |
| | PES | | nm | 11.0 | 11.0 | 11.0 |

TABLE 1-7

| | | | Unit | Comparative Example 1 | Comparative Example 2 | Comparative Example 3 | Comparative Example 4 |
|---|---|---|---|---|---|---|---|
| Ferromagnetic powder | Ferromagnetic powder No. | | — | 1 | 1 | 1 | 1 |
| | Raw material | Amount of Fe nitrate | g | 92.2 | 92.2 | 92.2 | 92.2 |
| | | Amount of Ga nitrate | g | 14.4 | 14.4 | 14.4 | 144 |
| | | Amount of Al nitrate | g | 0.0 | 0.0 | 0.0 | 0.0 |
| | | Amount of Co nitrate | g | 2.1 | 2.1 | 2.1 | 2.1 |
| | | Amount of Ti sulfate | g | 1.7 | 1.7 | 1.7 | 1.7 |

TABLE 1-7-continued

|  |  | Unit |  |  |  |  |
|---|---|---|---|---|---|---|
|  | Composition | Fe:Ga:Co:Ti | 1.62:0.28:0.05:0.05 | 1.62:0.28:0.05:0.05 | 1.62:0.28:0.05:0.05 | 1.62:0.28:0.05:0.05 |
|  | In-furnace temperature during heat treatment | °C. | 1000 | 1000 | 1000 | 1000 |
|  | 1st pulverization Rotation speed | rpm | 5000 | 5000 | 5000 | 5000 |
|  | Time | Minutes | 3 | 3 | 3 | 3 |
|  | 2nd pulverization Rotation speed | rpm | 10000 | 10000 | 10000 | 10000 |
|  | Time | Minutes | 1 | 1 | 1 | 1 |
|  | Ferromagnetic powder size | nm | 11.5 | 11.5 | 11.5 | 11.5 |
| Lubricant in composition for forming magnetic layer | Stearic acid | Parts | 1.0 | 1.0 | 1.0 | 1.0 |
|  | Butyl stearate | Parts | 1.0 | 1.0 | 1.0 | 1.0 |
|  | Stearic acid amide | Parts | — | — | — | — |
| Dispersion condition | 1st pass Bead diameter | mm | 0.5 | 0.5 | 0.5 | 0.5 |
|  | Time | Hours | 3 | 5 | 3 | 3 |
|  | 2nd pass Bead diameter | mm | 0.3 | — | 0.3 | 0.3 |
|  | Time | Hours | 3 | — | 3 | 3 |
| Electric field application treatment | Electric field strength | kV/mm | 0.0 | 1.2 | 1.2 | 1.2 |
|  | Protrusion forming agent | — | Protrusion forming agent 1 | Protrusion forming agent 1 | Protrusion forming agent 4 | Profusion forming agent 5 |
| Evaluation result | Intensity ratio after pressing (Int1/Int2) | — | 0.7 | 0.8 | 0.8 | 0.8 |
|  | PES | nm | 40.0 | 40.0 | 39.0 | 41.0 |

|  |  | Unit | Comparative Example 5 | Comparative Example 6 | Comparative Example 7 | Comparative Example 8 |
|---|---|---|---|---|---|---|
| Ferromagnetic powder | Ferromagnetic powder No. | — | 10 | 10 | 11 | 12 |
|  | Raw material Amount of Fe nitrate | g | 92.2 | 92.2 | 92.2 | 92.2 |
|  | Amount of Ga nitrate | g | 14.4 | 14.4 | 14.4 | 14.4 |
|  | Amount of Al nitrate | g | 0.0 | 0.0 | 0.0 | 0.0 |
|  | Amount of Co nitrate | g | 2.1 | 2.1 | 2.1 | 2.1 |
|  | Amount of Ti sulfate | g | 1.7 | 1.7 | 1.7 | 1.7 |
|  | Composition | Fe:Ga:Co:Ti | 1.62:0.28:0.05:0.05 | 1.62:0.28:0.05:0.05 | 1.62:0.28:0.05:0.05 | 1.62:0.28:0.05:0.05 |
|  | In-furnace temperature during heat treatment | °C. | 10000 | 10000 | 10000 | 10000 |
|  | 1st pulverization Rotation speed | rpm | — | — | 5000 | 5000 |
|  | Time | Minutes | — | — | 5 | 0.5 |
|  | 2nd pulverization Rotation speed | rpm | — | — | 10000 | 10000 |
|  | Time | Minutes | — | — | 3 | 0.5 |
|  | Ferromagnetic powder size | nm | 11.7 | 11.7 | 9.5 | 11.7 |
| Lubricant in composition for forming magnetic layer | Stearic acid | Parts | 1.0 | 1.0 | 1.0 | 1.0 |
|  | Butyl stearate | Parts | 1.0 | 1.0 | 1.0 | 1.0 |
|  | Stearic acid amide | Parts | — | — | — | — |
| Dispersion condition | 1st pass Bead diameter | mm | 0.5 | 0.5 | 0.5 | 0.5 |
|  | Time | Hours | 3 | 5 | 6 | 2 |
|  | 2nd pass Bead diameter | mm | 0.3 | — | 0.3 | 0.3 |
|  | Time | Hours | 3 | — | 6 | 2 |
| Electric field application treatment | Electric field strength | kV/mm | 1.2 | 0.0 | 1.7 | 0.5 |
|  | Protrusion forming agent | — | Protrusion forming agent 1 | Protrusion forming agent 4 | Protrusion forming agent 1 | Profusion forming agent 1 |
| Evaluation result | Intensity ratio after pressing (Int1/Int2) | — | 0.8 | 0.6 | 6.7 | 0.9 |
|  | PES | nm | 40.0 | 70.0 | 25.0 | 25.0 |

From the results shown in Table 1, it can be confirmed that, in all of the magnetic tapes of Examples, excellent running stability is exhibited after the pressing at a pressure of 70 atm, that is, in a state corresponding to a state after the long-term storage. Such a magnetic tape is suitable as a recording medium for archiving because it can stably run in the magnetic recording and reproducing device after being stored for a long period of time after information with a low access frequency is recorded.

One aspect of the present invention is effective in data storage applications.

What is claimed is:

1. A magnetic recording medium comprising:
a non-magnetic support; and
a magnetic layer containing a ferromagnetic powder,
wherein the ferromagnetic powder is an ε-iron oxide powder,
Int1/Int2, which is an intensity ratio of diffraction intensities obtained by an X-ray diffraction analysis of the magnetic layer using an In-Plane method after the magnetic layer is pressed at a pressure of 70 atm, is 1.0 or more and 6.5 or less, the Int1 is a maximum value of a diffraction intensity in a range in which a diffraction angle $2\theta\chi$ is 29.0° or more and 31.0° or less, and the Int2 is a maximum value of a diffraction intensity in a range in which the diffraction angle $2\theta\chi$ is 36.3° or more and 37.5° or less.

2. The magnetic recording medium according to claim 1, wherein the intensity ratio is 1.5 or more and 6.0 or less.

3. The magnetic recording medium according to claim 1, wherein the intensity ratio is 3.0 or more and 5.5 or less.

4. The magnetic recording medium according to claim 1, wherein the ε-iron oxide powder contains a cobalt element.

5. The magnetic recording medium according to claim 4, wherein the ε-iron oxide powder further contains an element selected from the group consisting of a gallium element and an aluminum element.

6. The magnetic recording medium according to claim 4, wherein the ε-iron oxide powder further contains a titanium element.

7. The magnetic recording medium according to claim 1, further comprising:
a non-magnetic layer containing a non-magnetic powder between the non-magnetic support and the magnetic layer.

8. The magnetic recording medium according to claim 1, further comprising:
a back coating layer containing a non-magnetic powder on a surface side of the non-magnetic support opposite to a surface side on which the magnetic layer is provided.

9. The magnetic recording medium according to claim 1, wherein the magnetic recording medium is a magnetic tape.

10. A magnetic tape cartridge comprising:
the magnetic tape according to claim 9.

11. The magnetic tape cartridge according to claim 10, wherein the intensity ratio is 1.5 or more and 6.0 or less.

12. The magnetic tape cartridge according to claim 10, wherein the intensity ratio is 3.0 or more and 5.5 or less.

13. The magnetic tape cartridge according to claim 10, wherein the ε-iron oxide powder contains a cobalt element.

14. The magnetic tape cartridge according to claim 13, wherein the ε-iron oxide powder further contains an element selected from the group consisting of a gallium element and an aluminum element.

15. The magnetic tape cartridge according to claim 13, wherein the ε-iron oxide powder further contains a titanium element.

16. The magnetic tape cartridge according to claim 10, wherein the magnetic tape further comprises:
a non-magnetic layer containing a non-magnetic powder between the non-magnetic support and the magnetic layer.

17. The magnetic tape cartridge according to claim 10, wherein the magnetic tape further comprises:
a back coating layer containing a non-magnetic powder on a surface side of the non-magnetic support opposite to a surface side on which the magnetic layer is provided.

18. A magnetic recording and reproducing device comprising:
the magnetic recording medium according to claim 1.

* * * * *